(12) United States Patent
Schreier et al.

(10) Patent No.: US 12,442,091 B2
(45) Date of Patent: Oct. 14, 2025

(54) ELECTROCHEMICAL DEHYDROGENATION, EPOXIDATION, SUBSTITUTION, AND HALOGENATION OF HYDROCARBONS AND HYDROCARBON DERIVATIVES

(71) Applicant: Wisconsin Alumni Research Foundation, Madison, WI (US)

(72) Inventors: Marcel Schreier, Madison, WI (US); Christine E. Lucky, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 18/334,847

(22) Filed: Jun. 14, 2023

(65) Prior Publication Data

US 2023/0323544 A1 Oct. 12, 2023

Related U.S. Application Data

(62) Division of application No. 17/545,805, filed on Dec. 8, 2021, now Pat. No. 11,718,920.

(Continued)

(51) Int. Cl.
*C25B 1/04* (2021.01)
*C07C 5/02* (2006.01)
(Continued)

(52) U.S. Cl.
CPC .................. *C25B 3/07* (2021.01); *C25B 3/03* (2021.01); *C25B 3/23* (2021.01); *C25B 3/25* (2021.01); *C25B 11/042* (2021.01); *C25B 11/043* (2021.01)

(58) Field of Classification Search
CPC .......... C25B 3/11; C25B 3/23; C25B 15/081; C25B 1/04; C25B 3/07; C07C 5/02; C07C 11/02; C07C 31/02
(Continued)

(56) References Cited

U.S. PATENT DOCUMENTS

| 3,288,692 A | * | 11/1966 | Leduc | .................. | C07D 301/14 |
| | | | | | 204/263 |
| 3,342,717 A | * | 9/1967 | Leduc | .................. | C07D 301/14 |
| | | | | | 204/266 |

(Continued)

FOREIGN PATENT DOCUMENTS

| WO | WO-2014046794 A2 | * | 3/2014 | ............... | C07C 1/26 |
| WO | WO 2021195746 A1 | | 7/2021 | | |

OTHER PUBLICATIONS

Chung et al., "Mechanism of Chlorine-Mediated Electrochemical Ethylene Oxidation in Saline Water," ACS Catalysis (Nov. 17, 2020), vol. 10, No. 23, p. 14015-14023. (Year: 2020).*

(Continued)

*Primary Examiner* — Edna Wong
(74) *Attorney, Agent, or Firm* — Joseph T. Leone; Yanjun Ma; DeWitt LLP

(57) ABSTRACT

A method of making alkenes and/or epoxides from alkanes and hydroxy-alkanes, respectively. In a reactor having an anode and a cathode separated by an ion exchange membrane, and containing a solution comprising water, halogen ions, and an alkane and/or a hydroxy-alkane, apply a potential across the anode and the cathode such that a halogenated intermediate is produced at the anode as an anolyte and hydroxyl ions are produced at the cathode as a catholyte; and combining the anolyte and the catholyte to yield an alkene and/or an epoxide.

19 Claims, 12 Drawing Sheets

Related U.S. Application Data

(60) Provisional application No. 63/122,503, filed on Dec. 8, 2020.

(51) Int. Cl.

| | |
|---|---|
| C07C 11/02 | (2006.01) |
| C07C 31/02 | (2006.01) |
| C25B 3/03 | (2021.01) |
| C25B 3/07 | (2021.01) |
| C25B 3/11 | (2021.01) |
| C25B 3/23 | (2021.01) |
| C25B 3/25 | (2021.01) |
| C25B 11/042 | (2021.01) |
| C25B 11/043 | (2021.01) |

(58) Field of Classification Search
USPC .......... 205/459, 460; 585/324, 500; 568/840
See application file for complete search history.

(56) References Cited

U.S. PATENT DOCUMENTS

| | | | |
|---|---|---|---|
| 4,119,507 A | 10/1978 | Simmrock | |
| 9,353,074 B2 | 5/2016 | Coupard et al. | |
| 2012/0292196 A1* | 11/2012 | Albrecht | C25B 1/00 204/242 |
| 2013/0105304 A1* | 5/2013 | Kaczur | C25B 9/23 204/290.01 |
| 2018/0245223 A1 | 8/2018 | Self et al. | |
| 2019/0032228 A1 | 1/2019 | Krause et al. | |
| 2023/0146508 A1* | 5/2023 | Leow | C25B 15/081 205/428 |

OTHER PUBLICATIONS

Miller et al., "Electrogenerative Bromination," Journal of The Electrochemical Society (Dec. 1, 1973), vol. 120, No. 12, pp. 1695-1697. (Year: 1973).*

Pietsch et al., "Electrogenerative Preparation of Halohydrins and Halogenated Alkanes," Electroorganic Synthesis Technology (1979), vol. 75, No. 185, pp. 51-55. (Year: 1979).*

Chung et al., "Mechanism of Chlorine-Mediated Electrochemical Ethylene Oxidation in Saline Water," ACS Catalysis (Nov. 17, 2020), vol. 10, No. 23, pp. 14015-14023. (Year: 2020).*

Schmitt et al., "Extraction of Methane from Seawater Using Ultrasonic Vacuum Degassing," Analytical Chemistry (Mar. 1, 1991), vol. 6, No. 5, pp. 529-532. (Year: 1991).*

Koidzumi, "The Electrolytic Oxidation of Alcohols, II: Electrolytic Chlorination of Ethylalcohol. Memoirs of the College of Science, Kyoto Imperial University. Series A," (Mar. 30, 1925), vol. 8, No. 3, pp. 155-166. (Year: 1925).

Sokolova et al., "Electrooxidation of Alcohols on Oxidized Platinum Electrode," Comptes Rendus de l'Academie Bulgare des Sciences (1973), vol. 26, No. 3, pp. 387-390. (Year: 1973).

Ryu, J., Wuttig, A. & Surendranath, Y. Quantification of Interfacial pH Variation at Molecular Length Scales Using a Concurrent Non-Faradaic Reaction. Angew. Chem. Int. Ed. 57, 9300-9304 (2018).

U.S. Appl. No. 17/545,805, filed Dec. 8, 2021, Marcel Schreier.

Ausfelder, F. et al. (2013) *Technology Roadmap—Energy and GHG Reductions in the Chemical Industry via Catalytic Processes*, a publication of the International Energy Agency (Paris, France) published online at www.iea.org/reports/technology-roadmap-energy-and-ghg-reductions-in-the-chemical-industry-via-catalytic-processes.

Baltruschat, H. Differential electrochemical mass spectrometry. J. Am. Soc. Mass Spectrom. 15, 1693-1706 (2004).

Bott, Adrian W., Heineman, William. R., Chronocoulometry. *Curr. Sep.* 20, 121-126 (2004).

Boulamanti A. and Moya, JA (2017), *Energy Efficiency and GHG Emissions: Prospective Scenarios for the Chemical and Petrochemical Industry*, a publication of the International Energy Agency (Paris, France).

Chung, M., Jin, K., Zeng, J. S., Manthiram, K., Mechanism of Chlorine-Mediated Electrochemical Ethylene Oxidation in Saline Water, *ACS Catal.*, 10, 14015-14023 (2020).

Cuesta, A., Kibler, L. A. & Kolb, D. M. A method to prepare single crystal electrodes of reactive metals: application to Pd(hkl). *J. Electroanal. Chem.* 466, 165-168 (1999).

Ding, D. et al. A novel low-thermal-budget approach for the co-production of ethylene and hydrogen via the electrochemical non-oxidative deprotonation of ethane. *Energy Environ. Sci.* 11, 1710-1716 (2018).

Ferro, S. et al. Chlorine Evolution at Highly Boron-Doped Diamond Electrodes. *J. Electrochem. Soc.* 147, 2614-2619 (2000).

Gasteiger, H. A., Markovic, N. M. & Ross, P. N. Bromide Adsorption on Pt(111): Adsorption Isotherm and Electrosorption Valency Deduced from $RRD_{Pt(111)}E$, Measurements. *Langmuir* 12, 1414-1418 (1996).

Grant, J. T. et al. Selective oxidative dehydrogenation of propane to propene using boron nitride catalysts. *Science* 354, 1570-1573 (2016).

Kuhn, A. T. & Chan, C. Y. pH changes at near-electrode surfaces. *J. Appl. Electrochem.* 13, 189-207 (1983).

Leow, W. R., Lum, Y., Ozden, A., Wang, Y., Nam, D.-H., Chen, B., Wicks, Zhuang, T.-T, Li, F., Sinton, D., Sargent, E. H., Chloride-mediated selective electrosynthesis of ethylene and propylene oxides at high current density, *Science*, 368, 1228-1233 (2020).

Li, S. & Bartlett, B. M. Selective Chloride-Mediated Neat Ethanol Oxidation to 1,1-Diethoxyethane via an Electrochemically Generated Ethyl Hypochlorite Intermediate. *J. Am. Chem. Soc.* 143, 15907-15911 (2021).

Lyalin, B. V. & Petrosyan, V. A. Electrochemical Halogenation of Organic Compounds. *Russ. J. Electrochem.* 49, 497-529 (2013).

Marselli, B., Garcia-Gomez, J., Michaud, P.-A., Rodrigo, M. A. & Comninellis, C., Electrogeneration of Hydroxyl Radicals on Boron-Doped Diamond Electrodes. *J. Electrochem. Soc.* 150, D79-D83 (2003).

Mccabe and Warner, The Kinetics of the Reaction between the Ethylene Halohydrins and Hydroxyl Ion n Water and Mixed Solvents, *J. Am. Chem Soc.* 70:4031-4034 (1948).

Muller, U., Dulberg, A. & Baltruschat, H. Coadsorption, non-reactive displacement and cathodic desorption of ethene preadsorbed on Pd and Pt electrodes. *Colloids Surf. Physicochem. Eng. Asp.* 134, 155-164 (1998).

Oliver, B. G., Carey, J. H., Photochemical Production of Chlorinated Organics in Aqueous Solutions Containing Chlorine, *Environ. Sci. Technol.*, 11, 893-895 (1977).

Sanfilippo, D. & Rylander, P. N. Hydrogenation and Dehydrogenation. In Ullmann's Encyclopedia of Industrial Chemistry (Wiley-VCH Verlag GmbH & Co. KGaA, 2009).

Sattler, J. J. H. B., Ruiz-Martinez, J., Santillan-Jimenez, E. & Weckhuysen, B. M. Catalytic Dehydrogenation of Light Alkanes on Metals and Metal Oxides. *Chem. Rev.* 114, 10613-10653 (2014).

Sattler, A. Hydrogen/Deuterium (H/D) Exchange Catalysis in Alkanes. *ACS Catal.* 8, 2296-2312 (2018).

Sulaiman, J. E., Zhu, S., Xing, Z., Chang, Q. & Shao, M. Pt—Ni Octahedra as Electrocatalysts for the Ethanol Electro-Oxidation Reaction. *ACS Catal.* 7, 5134-5141 (2017).

Trimarco, D. B. et al. Enabling real-time detection of electrochemical desorption phenomena with sub-monolayer sensitivity. *Electrochimica Acta* 268, 520-530 (2018).

Watanabe, Akai, and Einaga, The reduction behavior of free chlorine at boron-doped diamond electrodes, *Electrochem. Commun.* 70:18-22 (2016).

* cited by examiner

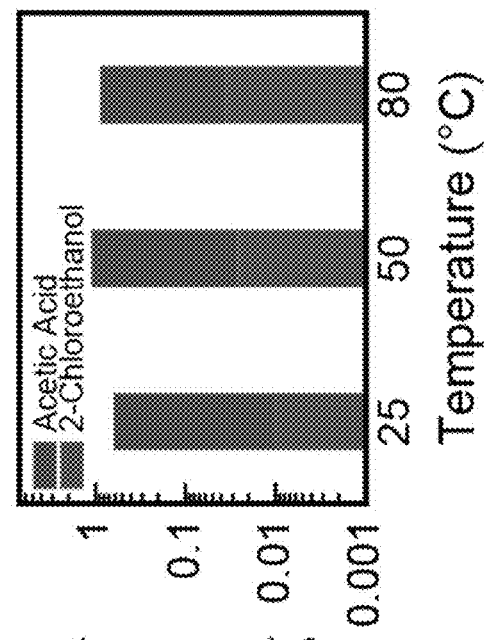
Figure 9B
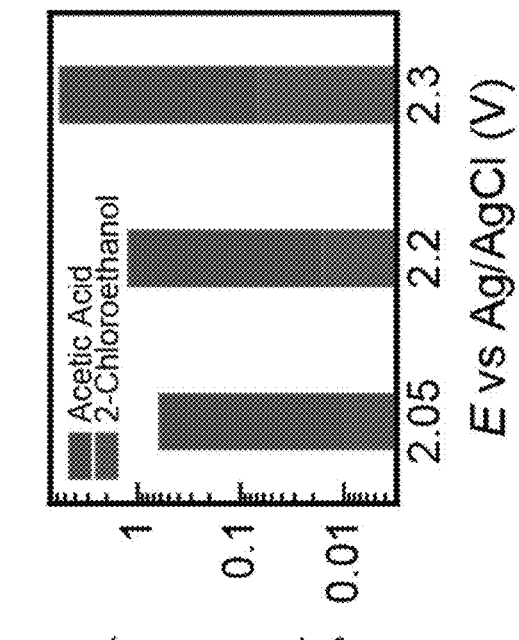
Figure 9D
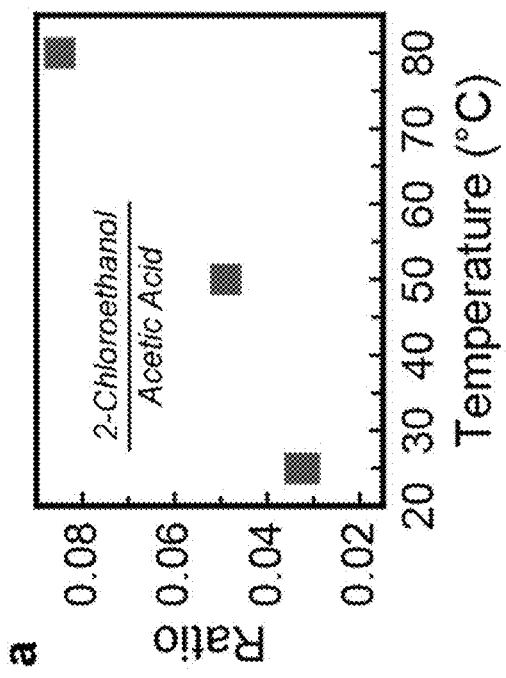
Figure 9A
Figure 9C

Figure 11
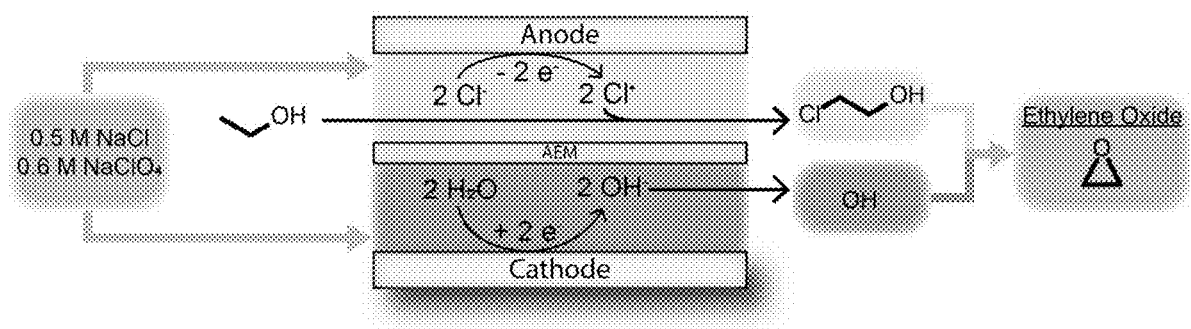
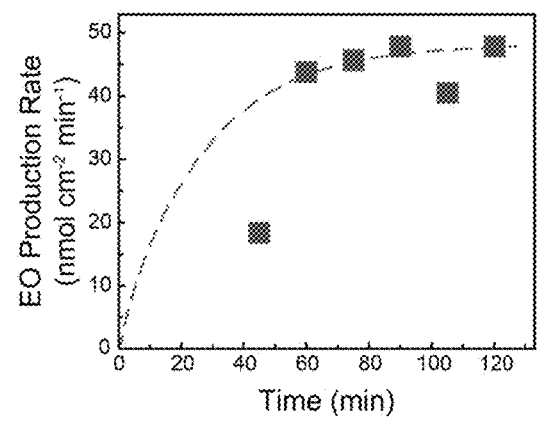
Figure 12

US 12,442,091 B2

ELECTROCHEMICAL DEHYDROGENATION, EPOXIDATION, SUBSTITUTION, AND HALOGENATION OF HYDROCARBONS AND HYDROCARBON DERIVATIVES

CROSS-REFERENCE TO RELATED APPLICATIONS

This is a divisional of application Ser. No. 17/545,805, filed Dec. 8, 2021, now U.S. Pat. No. 11,718,920, which claims benefit to provisional application Ser. No. 63/122,503, filed Dec. 8, 2020, which is incorporated herein by reference.

FIELD OF THE INVENTION

This disclosure relates to systems and methods of electrochemically synthesizing one or more desired chemical products from hydrocarbon or hydrocarbon derivative reactants, principle among them being ethylene oxide.

BACKGROUND

In the United States, chemical manufacture accounts for 28% of total industrial energy demand. This energy demand is largely met by the consumption of fossil fuels, resulting in substantial carbon dioxide emissions. To reduce such unwanted emissions, it would be desirable to develop new chemical production methods driven by renewable energy sources that could replace conventional fossil fuel-based production methods.

For example, light olefins (C1 to C4 alkenes) are crucial building blocks for numerous chemical products. Light olefins are increasingly produced by the high-temperature dehydrogenation of light alkanes over Pt or $CrO_x$ catalysts. This process takes place at very high temperatures (typically greater than 525° C.). Accordingly, it uses a large amount of fossil fuel-generated energy, is highly inefficient, and results in premature coking (i.e., deactivation) of the catalyst. Suggested strategies for lowering the operating temperature for this process include introducing $O_2$ to displace the equilibrium in favor of the dehydrogenated product. In practice, this strategy results in unacceptably low selectivity due to the over-oxidation of alkenes to CO and $CO_2$.

In another example, the existing technology for the synthesis of epoxides uses alkenes as substrates. Olefins can be converted over an Ag catalyst at high temperatures and pressures (200-300° C. and 1-3 MPa) or using high energy intermediates such as hydrogen peroxide and HOBr. Again, the required high temperatures and pressures are generated by the consumption of fossil fuels. In addition, because the synthesis of epoxides from alkanes would require an intermediate dehydrogenation or cracking step to generate the alkene (see above), this would not be an environmentally friendly route to the production of these important products. Furthermore, processes that rely on direct oxidation of alkenes are prone to overoxidation of the alkanes to $CO_2$. Due to the adsorption behavior of $O_2$ on Ag, epoxidation over Ag catalysts has a theoretical upper selectivity limit of 85.7%.

Conventional processes used to make other important chemical products from light alkanes exhibit similar problems related to lack of selectivity and high energy-consumption (particularly of fossil fuel-generated energy). Accordingly, there is a need in the art for new methods of synthesizing desired chemical products from light alkanes, alcohols, and the like, that are more selective, more energy-efficient, and that can use renewable sources of energy, while ideally minimizing the need for energy derived from fossil fuel consumption.

Notably, ethylene oxide (EO; IUPAC name: oxirane) is central to the chemical industry. EO is a precursor for a wide range of chemicals including ethylene glycol, glycol ethers, and epoxy resins. Its versatility as a platform chemical makes EO the 12th highest-volume organic compound, with approximately 20 million metric tons produced annually. F. Ausfelder et al. (2013) *Technology Roadmap—Energy and GHG Reductions in the Chemical Industry via Catalytic Processes*, a publication of the International Energy Agency (Paris, France); published online at www.iea.org/reports/technology-roadmap-energy-and-ghg-reductions-in-the-chemical-industry-via-catalytic-processes. Industrially, ethylene oxide is manufactured by the direct oxidation of ethylene using $O_2$ as an oxygen source. The reaction occurs on supported silver catalysts at temperatures of 200-260° C. and pressures of 10-30 bar. The conventional process has significant environmental impacts. Not only are 0.9 tons of $CO_2$ emitted per ton of ethylene oxide produced, but the substrate alkenes themselves have a significant carbon footprint, with over a ton of $CO_2$ being released for every ton of olefin. Boulamanti A and Moya JA (2017), *Energy Efficiency and GHG Emissions: Prospective Scenarios for the Chemical and Petrochemical Industry*, a publication of the International Energy Agency (Paris, France); published online at file:///C:/Users/jtl/Downloads/kj-na-28471-enn %20(1).pdf, and D. Ding, Y. Zhang, W. Wu, D. Chen, M. Liu, T. He, *Energy Environ. Sci.* 2018, 11, 1710-1716.

Cyclization of 2-chloroethanol to ethylene oxide has been described in the prior art. For example, an electrochemical process that converts olefins to epoxides using electricity, water, and a metal halide electrolyte was patented in 1966. See U.S. Pat. No. 3,288,692, issued Nov. 29, 1966, to J. A. M. Leduc. The process follows a pathway similar to older chlorohydrin-based synthesis routes for ethylene oxide manufacturing by forming a halohydrin from an electrochemically generated dihalogen and an olefin. The subsequent epoxidation reaction in an alkaline environment regenerates the halide ion and forms ethylene oxide with hydrogen gas as the sole byproduct. More recently, the chlorine-mediated electrochemical synthesis of ethylene oxide has been demonstrated on a variety of materials and at current densities up to 1 A $cm^{-2}$, which indicate this method of epoxide synthesis can be industrially relevant. See M. Chung, K. Jin, J. S. Zeng, K. Manthiram, *ACS Catal* 2020, 10, 14015-14023 and W. R. Leow, Y. Lum, A. Ozden, Y. Wang, D.-H. Nam, B. Chen, J. Wicks, T.-T. Zhuang, F. Li, D. Sinton, E. H. Sargent, *Science* 2020, 368, 1228-1233. However, these prior-art, chlorine-mediated routes to epoxides rely on alkene substrates, which entails the relatively facile chlorination of C═C ($sp^2$-hybrized) bonds. The method disclosed hereinbelow requires expanding the feedstocks to biomass-based molecules such as alcohols, which requires halogenating a saturated C—H bond (the carbon atom is spa hybridized).

The difficulty of activating the stable $C(sp^3)$-H bond in ethanol to produce the desired 2-chloroethanol intermediate has precluded this electrochemical valorization strategy. Prior investigations into the electrochlorination of ethanol did not produce chlorohydrin. Instead, in acidic aqueous electrolytes trichloromethane and 2,2,2-trichloroethane-1,1-diol were formed in yields of >95%, while anhydrous electrochlorination led to chloroacetaldehyde. (Lyalin, B. V. & Petrosyan, V. A. Electrochemical Halogenation of Organic Compounds. *Russ. J. Electrochem.* 49, 497-529 (2013).) These more highly substituted species are formed as the initial products rapidly react further under the strong driving forces needed for the initial halogenation. Similarly, the strong oxidative potentials required for chlorination on most electrocatalyst materials result in overoxidized products, including $CO_2$, in the complete oxidation of ethanol. (13. Sulaiman, J. E., Zhu, S., Xing, Z., Chang, Q. & Shao, M. Pt—Ni Octahedra as Electrocatalysts for the Ethanol Electro-Oxidation Reaction. *ACS Catal.* 7, 5134-5141 (2017).) Recently, the selective chlorination of neat ethanol to ethyl hypochlorite using a glassy carbon working electrode has been reported. Li, S. & Bartlett, B. M. Selective Chloride-Mediated Neat Ethanol Oxidation to 1,1-Diethoxyethane via an Electrochemically Generated Ethyl Hypochlorite Intermediate. *J. Am. Chem. Soc.* 143, 15907-15911 (2021). Under these conditions, the initial oxidation of chloride to an active species on glassy carbon facilitates an indirect oxidation mechanism that helps prevent overoxidation. However, this approach has not been demonstrated to produce other chlorinated products, including 2-chloroethanol.

One route to prepare 2-chloroethanol consists of the electrochemical generation of chlorine radicals, which subsequently initiate the halogenation of ethanol. Support for this approach comes from the observation of 2-chloroethanol formation by exposing ethanol and chlorine to UV irradiation. B. G. Oliver, J. H. Carey, *Environ. Sci. Technol.* 1977, 11, 893-895. This radical reaction has unfavorable thermodynamics, however, since production of 2-chloroethanol requires hydrogen abstraction at the β-carbon of ethanol. Yet, hydrogen abstraction from the α-carbon (forming 1-chloroethanol) is 7.6 kcal/mol more favorable and leads to acetic acid through the transient formation of acetaldehyde (FIG. 2). This leads to an interesting selectivity challenge, requiring control of α vs β C(sp3)—H activation, which is central to the sustainable electrosynthesis of ethylene oxide.

SUMMARY OF THE INVENTION

The figures noted hereinabove highlight that sustainable alkene and ethylene oxide production requires both using renewable energy as a driving force and a renewable substrate. Neither parameter is present in the conventional, industrial route. The rapidly increasing availability of renewable electricity provides an attractive energy source for sustainable chemical transformations (as contrasted to fossil fuels). In the case of ethylene oxide synthesis specifically, using electricity as driving force opens a net-zero emission pathway to plastics if a renewable feedstock is used in the reaction.

Ethanol is a desirable feedstock for EO synthesis because it is one of the most abundant sustainably produced chemicals and finds daily use as a biomass-derived gasoline additive. This makes the synthesis of ethylene oxide from ethanol an attractive prospect, opening a direct route to sustainable high-performance plastics. Importantly, the method disclosed herein has excellent atom economy because it takes place without the need for a molecular oxygen source. That is, while the method disclosed herein may proceed in the presence of $O_2$ (and even added $O_2$), molecular oxygen is not required. Thus, in the preferred version of the method, it proceeds in the absence of added $O_2$ (ambient atmospheric $O_2$ of course being present).

To date, ethylene oxide production from ethanol is limited to schemes which rely on the initial conversion of ethanol to ethylene while requiring fossil energy sources. See, for example, U.S. Pat. No. 9,353,074, Method for Producing Ethylene Oxide from a Thermally Integrated Ethanol Stream, issued May 31, 2016, to Coupard and Plennevaux, 2016, B2. The conventional process is doubly inefficient because it increases process complexity and energy demand, while simultaneously discarding the oxygen atom already present in the ethanol feedstock.

We disclose herein new electrochemical systems and methods for synthesizing a wide range of desired chemical products from hydrocarbons or hydrocarbon derivatives, including, without limitation, alkanes and corresponding derivatives, such as oxygenates (e.g., alcohols, ethers, esters), amides or nitriles. The disclosed syntheses are driven by electricity, and require much less fossil fuel-generated heat than conventional methods for synthesizing the desired products. Ideally, the needed electricity is derived from renewable sources, such as solar, wind or geothermal energy, rather than from the consumption of fossil fuels.

The disclosed systems and methods work by directly coupling electrical energy to central chemical transformations such as alkane dehydrogenation, alkane epoxidation, and alkane substitution. Exemplary desired chemical products include, without limitation, halogenated alkanes, halogenated alcohols, alkenes, epoxides, alcohols, acids, aldehydes, and nitriles.

In one exemplary non-limiting embodiment, the disclosed systems and methods use electricity instead of heat as the driving force for the dehydrogenation of light alkanes—thus permitting operation near room temperature. Under these conditions, deactivation of the catalyst is greatly reduced or eliminated. Additionally, there is spatial separation of the alkane oxidation from the generation of the alkene, thus mitigating the issue of alkene overoxidation and thereby improving selectivity.

In another exemplary non-limiting embodiment, the disclosed systems and methods provide a route to make epoxides from alkanes through the intermediate step of the electrochemical synthesis of a halohydrin (i.e., chlorohydrin) near room temperature. This completely new route to achieve this transformation avoids the inherent specificity limitations of current technologies. Thus, disclosed herein is a more direct route to address these shortcomings by halogenating a hydroxy-substituted alkane (i.e., an alcohol), to yield a halohydrin, followed by internal cyclization to yield the corresponding cycle ether (i.e., the corresponding epoxide). If the starting material is a 1-hydroxy, linear alkane, and the halo substituent is placed on the other terminal end of the alkane, the result is the unsubstituted epoxide having the same number of carbon atoms. That is, 2-halo-ethanol yields ethylene oxide (i.e., oxirane)

3-halo-1-propanol yields oxetane

4-halo-1-butanol yields tetrahydrofuran (i.e., oxolane)

5-halo-1-pentanol yields tetrahydropyran (i.e., oxane)

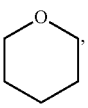

etc. If either the halo substituent or the hydroxy substituent are internal in the feedstock the product will be alkyl-substituted epoxies.

Thus, by way of example, and not limitation, one version of the method includes halogenating ethanol (e.g., using chlorine for example) to chlorohydrin (i.e., 2-chloroethanol), and then cyclizing the 2-chloroethanol to yield ethylene oxide. As noted above, In a first aspect, this disclosure encompasses a method of making a desired chemical product from a hydrocarbon or hydrocarbon derivative reactant. The method includes the step of using an anode and a cathode that is not in direct contact with the anode to apply an electrical potential to a composition that includes a hydrocarbon or hydrocarbon derivative and a halide ion, preferably a chloride ion or bromide ion. As a result, the desired chemical product is produced. In other versions of the method, the anode and cathode need not be separated; an undivided reaction chamber may be used.

In some embodiments, the hydrocarbon or hydrocarbon derivative is an alkane, a hydrocarbon oxygenate, a nitrile, or an amide. In some such embodiments, the hydrocarbon oxygenate is an alcohol, an ether, or an ester.

The hydrocarbon or hydrocarbon derivative can be of any size or molecular mass, and the disclosed methods are not limited to any specific size range for the hydrocarbon or hydrocarbon derivative. However, in some non-limiting exemplary embodiments, the hydrocarbon or hydrocarbon derivative is a C1-C8 compound or a C1-C4 compound. In some such embodiments, the C1-C8 compound or C1-C4 compound is a C1-C8 or C1-C4 alkane or a C1-C8 or C1-C4 alcohol.

In some embodiments, the desired chemical product is a chloroalkane or bromoalkene intermediate or a product of the further reaction of the chloroalkane or bromoalkene intermediate.

In some embodiments, the desired chemical product is a chlorinated hydrocarbon, a brominated hydrocarbon, an alkene, an epoxide, an alcohol, an acid, an aldehyde, a nitrile, a chlorohydrin, a bromohydrin, vinyl chloride, vinyl bromide, another product of an elimination reaction of the chloroalkane or bromoalkane intermediate, another product of a substitution reaction of the chloroalkane or bromoalkane intermediate, a product of a direct reaction between the chloroalkane or bromoalkane intermediate and the cathode or the anode, the product of the reduction of an alkene at the cathode surface, or combinations thereof.

In some embodiments, the method occurs within a temperature range of 0 to 200° C. In some such embodiments, the method occurs within a temperature range of 0 to 150° C. In further such embodiments, the method occurs within a temperature range of 0 to 100° C.

In some embodiments, the method takes place within an electrochemical cell comprising the anode, the cathode, and the composition. In some such embodiments, the electrochemical cell further includes an electrolyte that is in contact with the anode and the cathode.

In some embodiments, the electrolyte includes a liquid, polymeric, or solid state ion conductor.

In some embodiments, the electrolyte includes an electrolyte solvent. In some such embodiments, the electrolyte solvent includes water, one or more organic solvents, or a mixture thereof.

In some embodiments, the solubility of the chloroalkane or bromoalkane intermediate in the electrolyte solvent is higher than the solubility of the hydrocarbon or hydrocarbon derivative in the electrolyte solvent.

In some embodiments, the solubility of the chloroalkane or bromoalkane intermediate in the electrolyte solvent is higher than the solubility of the desired chemical product in the electrolyte solvent.

In some embodiments, the solubility of the chloroalkane or bromoalkane intermediate in the electrolyte solvent is higher than the solubility of both the hydrocarbon or hydrocarbon derivative and the desired chemical product in the electrolyte solvent.

In some embodiments, the anode, the cathode, or both the anode and the cathode are gas diffusion electrodes. In some embodiments, the anode, the cathode or both the anode and the cathode are gas diffusion layers contacting a polymer or inorganic electrolyte or mixed ion-electron conductor.

In some embodiments, the anode surface includes a polarizable anode material. In some such embodiments, the preferred (non-limiting) polarizable anode material is selected from the group consisting of boron-doped diamond, tetrahedral amorphous carbon, and tetrahedral amorphous carbon nitride, platinum, and the like.

In some embodiments, the chloride ion or bromide ion directly contacts the anode surface. In some such embodiments, the chloride ion or bromide ion form monochlorine or monobromine radicals at the anode surface that subsequently react with the hydrocarbon or hydrocarbon derivative to produce the corresponding chloroalkane or bromoalkane intermediate. In some such embodiments, the reaction of the monochlorine or monobromine radical with the hydrocarbon or hydrocarbon derivative to produce the corresponding chloroalkane or bromoalkane intermediate does not occur at the anode surface.

In some embodiments, the anode surface includes one or more platinum group metals, Ni, or another material which dissociatively binds alkanes. In some such embodiments, the one or more platinum group metals may include platinum, palladium or ruthenium.

In some embodiments, the chloride ion or bromide ion and the hydrocarbon or hydrocarbon derivative directly contact the anode surface. In some such embodiments, the hydrocarbon or hydrocarbon derivative is dissociatively bound to the anode surface, where it is subsequently brominated or chlorinated.

In some embodiments, production of the desired product is directly driven by electron transfer at or on the cathode surface.

In some embodiments, the environment adjacent to the cathode surface is alkaline. In some such embodiments, hydroxide ions are generated at the cathode surface, thus generating an electrochemical pH gradient wherein the environment nearer the cathode has a higher pH than the environment further from the cathode. In some such embodiments, the hydroxide ions generated at the cathode react with the chloroalkane or bromoalkane intermediate to produce the desired chemical product. In some embodiments, the reaction of the chloroalkane or bromoalkane intermediate with the hydroxide ion does not occur at the cathode surface.

In some embodiments, the electrolyte includes an organic solvent that acts to enhance the alkalinity generated at the cathode by decreasing the amount of solubilized hydroxide ion. In some embodiments, the organic solvent is chemically inert.

In some embodiments, the cathode is configured to (a) minimize direct contact of the chloroalkane or bromoalkane intermediate with the cathode surface, (b) prevent the binding of the chloroalkane or bromoalkane intermediate to the cathode surface, or (c) prevent the binding of the epoxide or alkene or other product to the surface to avoid their further electrochemical or chemical transformation. In some such embodiments, the cathode surface comprises a porous layer. In some such embodiments, the cathode surface includes a composition that is not chemically reactive.

In some embodiments, the anode is configured to (a) minimize direct contact of the chloroalkane or bromoalkane intermediate with the anode surface, or (b) prevent the binding of the chloroalkane or bromoalkane intermediate to the anode surface.

In some embodiments, the method further includes the step of removing the desired chemical product from the electrochemical cell. In some such embodiments, the cathode is a gas diffusion electrode, and the desired chemical product is removed from the electrochemical cell by passing through the cathode.

In some embodiments, the method further includes the step of adding the hydrocarbon or hydrocarbon derivative reactant to the electrochemical cell. In some such embodiments, the anode is a gas diffusion electrode, and the hydrocarbon or hydrocarbon derivative reactant is added to the electrochemical cell by passing through the anode.

In some embodiments, electrons driven by the applied electrical potential flow in an external circuit from the anode to the cathode. In some such embodiments, a corresponding charge flow made up of migrating ions is maintained within the electrochemical cell.

In some embodiments, bromide or chloride ions migrate within the electrochemical cell away from the cathode and towards the anode. In some embodiments, protons or hydronium ions migrate within the electrochemical cell towards the cathode and away from the anode.

In some embodiments, the anode-driven reaction (the formation of the chloroalkane or bromoalkane intermediate) and cathode-driven reaction (the formation of hydroxide ion or the direct transfer of electrons at or on the cathode surface) and are flux-matched.

In some embodiments, the electron flow and the ion flow are both continuous, resulting in the corresponding continuous production of the desired chemical product and consumption of the hydrocarbon or hydrocarbon derivative reactant. In some such embodiments, the hydrocarbon or hydrocarbon derivative reactant is continuously added to the electrochemical cell, and the desired chemical product is continuously removed from the electrochemical cell.

In a second aspect, this disclosure encompasses system for electrochemically synthesizing a desired chemical product from a hydrocarbon or hydrocarbon derivative reactant. The system includes (a) an anode that is a gas diffusion electrode having an anode surface that includes a polarizable anode material, one or more platinum group metals, nickel, or another material that dissociatively binds alkanes; and (b) a cathode that is a gas diffusion electrode and that is configured to minimize the binding or reaction of a chloroalkane or bromoalkane to or with the cathode surface or to prevent the binding of the epoxide or alkene or other product to the surface to avoid their further electrochemical or chemical transformation.

In some embodiments, the one or more platinum group metals may be platinum, palladium or ruthenium.

In some embodiments, the polarizable anode material is boron doped diamond, tetrahedral amorphous carbon nitride, or tetrahedral amorphous carbon.

In some embodiments, the cathode surface includes a porous layer.

In some embodiments, the cathode surface includes a composition that is not chemically reactive.

In some embodiments, the anode surface is configured to minimize the binding or reaction of a chloroalkane or bromoalkane to or with the anode surface.

In some embodiments, the system further includes an electrolyte. In some such embodiments, the electrolyte includes a liquid, polymeric, or solid state ion conductor.

In some embodiments, the electrolyte includes an electrolyte solvent. In some such embodiments, the electrolyte solvent is water, one or more organic solvents, or a mixture thereof. In some such embodiments, the one or more organic solvents are chemically inert. The embodiment may include an electrical current source and may or may not include a temperature control system.

In some embodiments, the solubility of a chloroalkane or bromoalkane in the electrolyte solvent is higher than the solubility of the corresponding hydrocarbon or hydrocarbon derivative in the electrolyte solvent.

In some embodiments, the solubility of a chloroalkane or bromoalkane in the electrolyte solvent is higher than the solubility of the corresponding alkene in the electrolyte solvent.

In some embodiments, the solubility of a chloroalkane or bromoalkane in the electrolyte solvent is higher than the solubility of both the corresponding hydrocarbon or hydrocarbon derivative and the corresponding alkene.

In some embodiments, the solubility of hydroxide ion in the electrolyte solvent is less than the solubility of hydroxide ion in water.

In a third aspect, this disclosure encompasses an electrochemical cell that includes the components of any of the system embodiments described above, including the anode, the cathode and the electrolyte. In the electrochemical cell, the anode and cathode are not in contact, and the anode and cathode are both in contact with the electrolyte.

In some embodiments, the electrochemical cell further includes a hydrocarbon or hydrocarbon derivative reactant. In some such embodiments, the hydrocarbon or hydrocarbon derivative is dissociatively bound to the anode surface.

In some embodiments, the hydrocarbon or hydrocarbon derivative is an alkane, a hydrocarbon oxygenate, a nitrile, or an amide. In some such embodiments, the hydrocarbon oxygenate is an alcohol, an ether, or an ester.

The hydrocarbon or hydrocarbon derivative can be of any size or molecular mass, and the disclosed methods are not limited to any specific size range for the hydrocarbon or hydrocarbon derivative. However, in some embodiments, the hydrocarbon or hydrocarbon derivative is a C1-C8 or C1-C4 compound. In some such embodiments, the C1-C8 or C1-C4 compound is a C1-C8 or C1-C4 alkane or a C1-C8 or C1-C4 alcohol.

In some embodiments, the electrochemical cell further includes a chloride ion or bromide ion. In some such embodiments, the chloride ion or bromide ion is in direct contact with the anode surface. In some such embodiments, the electrochemical cell further includes a monochlorine or monobromine radical.

In some embodiments, the electrochemical cell further includes a corresponding chloroalkane or bromoalkane intermediate.

In some embodiments, the environment adjacent to the cathode surface is alkaline. In some such embodiments, the electrochemical cell includes an electrochemical pH gradient, where the environment nearer the cathode has a higher pH than the environment further from the cathode.

In some embodiments, when the electrochemical cell is in operation, electrons driven by an applied electrical potential flow in an external circuit from the anode to the cathode. In some such embodiments, a corresponding charge flow made up of migrating ions is maintained within the electrochemical cell.

In some such embodiments, bromide or chloride ions migrate within the electrochemical cell away from the cathode and towards the anode. In some such embodiments, protons or hydronium ions migrate within the electrochemical cell towards the cathode and away from the anode.

In some embodiments, the electron flow and the ion flow are both continuous, resulting in the corresponding continuous production of a desired chemical product and consumption of a hydrocarbon or hydrocarbon derivative reactant.

In some embodiments, the electrochemical cell further includes a membrane or barrier separating the anode and the cathode.

Also disclosed herein is a method of making hydroxy-alkanes, alkenes, and/or epoxides. The method comprises, in a reactor comprising an anode and a cathode separated by an ion exchange membrane, and containing a reactant selected from the group consisting of an alkane and a hydroxy-alkane; and a solution comprising water, halogen ions, applying a potential across the anode and the cathode such that a halogenated intermediate is produced at the anode as an anolyte and hydroxyl ions are produced at the cathode as a catholyte; and combining the anolyte and the catholyte to yield a hydroxy-alkane and/or an alkene when the reactant comprises an alkane and an epoxide when the reactant comprises a hydroxy-alkane.

The anode, or the cathode, or both the anode and the cathode may optionally be polarizable electrodes. Preferred electrode materials include, but are not limited to boron-doped diamond (BDD), tetrahedral amorphous carbon, tetrahedral amorphous carbon nitride, and platinum.

Another embodiment is a method of making ethylene oxide from ethanol. Here, the method comprises, in a reactor comprising an anode and a cathode separated by an anion exchange membrane, and containing a solution comprising water, halogen ions, and ethanol, applying a potential across the anode and the cathode such that 2-chloro-ethanol is produced at the anode as an anolyte and hydroxyl ions are produced at the cathode as a catholyte, and combining the anolyte and the catholyte to yield ethylene oxide. A method of making epoxides from hydroxy-alkanes, the method comprising:

Yet another version of the method comprises, in a reactor comprising an anode and a cathode and containing a solution comprising water, halogen ions, and a hydroxy-alkane, applying a potential across the anode and the cathode such that a halogenated hydroxy-alkane is produced at the anode as an anolyte and hydroxyl ions are produced at the cathode as a catholyte; and whereby the anolyte and the catholyte react to yield an epoxide.

Also disclosed is a method of making methanol. The method comprises, in a reactor comprising an anode and a cathode separated by an ion exchange membrane, and containing a reactant comprising methane, and a solution comprising water and halogen ions, applying a potential across the anode and the cathode such that a halogenated intermediate is produced at the anode as an anolyte and hydroxyl ions are produced at the cathode as a catholyte; and combining the anolyte and the catholyte to yield methanol.

Further objects, features and advantages of the invention will be apparent from the following detailed description when taken in conjunction with the accompanying drawings.

BRIEF DESCRIPTION OF THE DRAWINGS

The disclosure will be better understood and features, aspects and advantages other than those set forth above will become apparent when consideration is given to the following detailed description. Such detailed description makes reference to the following drawings.

FIGS. 9A and 9B depict the ratio of 2-chloroethanol to acetic acid (FIG. 9A) partial current density toward each product (FIG. 9B) after applying 2.05 V vs Ag/AgCl to 0.5 M NaCl and 100 mM ethanol at various temperatures. FIGS. 9C and 9D depict the ratio of 2-chloroethanol to acetic acid (FIG. 9C) current density toward each product (FIG. 9D) at room temperature electrolysis of 0.5 M NaCl and 100 mM ethanol at varying potentials.

FIG. 11 is a schematic diagram of the electrochemical ethanol-to-ethylene oxide integrated cell design.

FIG. 12 is a graph depicting the production rate of ethylene oxide in the integrated flow cell shown schematically in FIG. 11 during a 2-hour experiment as measured by the concentration of the mixed anolyte and catholyte effluent.

Figure 1:
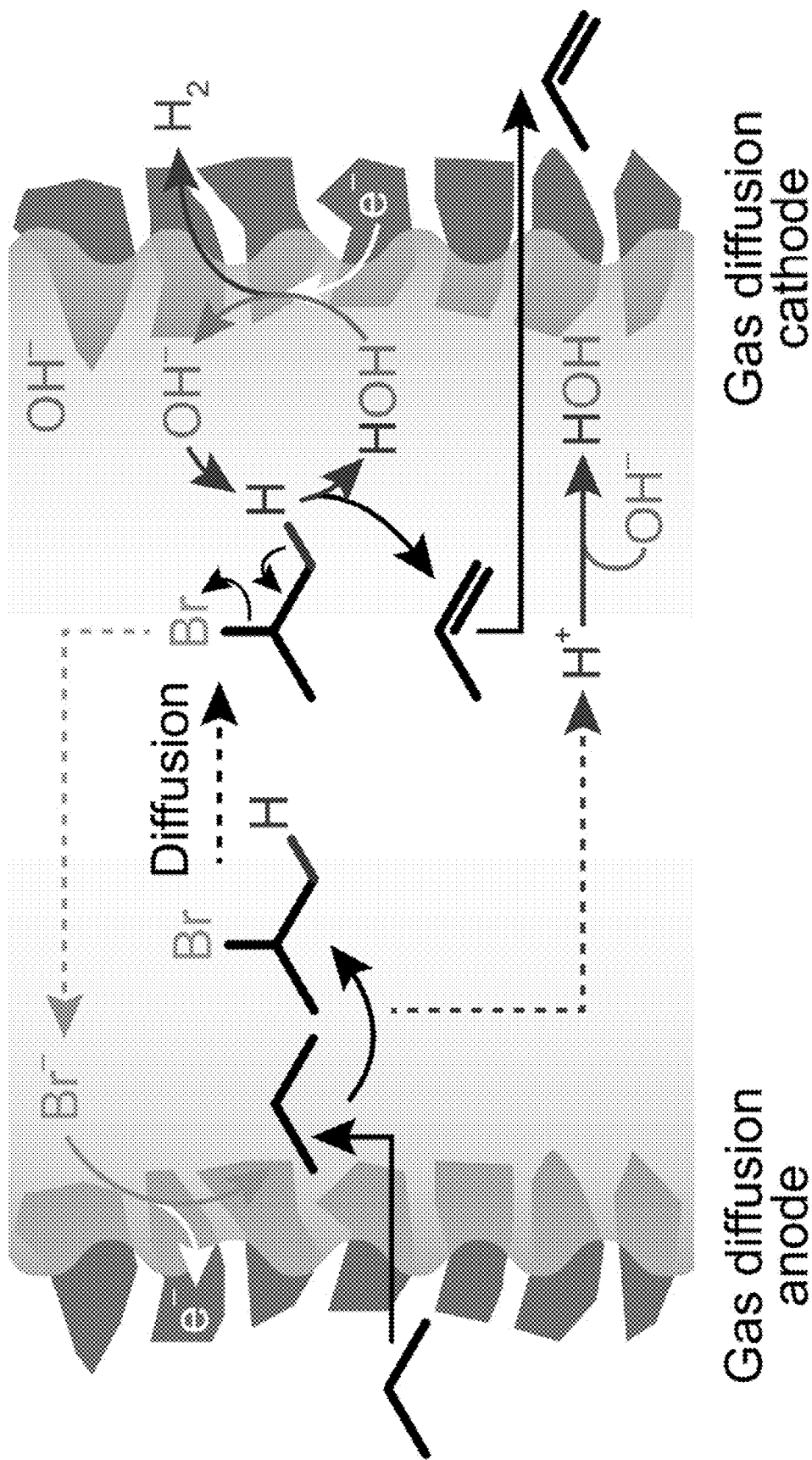
FIG. 1 illustrates an exemplary complete electrochemical dehydrogenation process to produce olefins from alkanes using an electrochemical cell with gas diffusion electrodes. Dashed lines indicate transport in the electrolyte.

While the invention is susceptible to various modifications and alternative forms, specific embodiments have been shown by way of example in the drawings and are herein described in detail. The description of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Abbreviations and Definitions

All combinations of method or process steps as used herein can be performed in any order, unless otherwise specified or clearly implied to the contrary by the context in which the referenced combination is made.

The methods of the present invention can comprise, consist of, or consist essentially of the essential elements and limitations of the method described herein, as well as any additional or optional ingredients, components, or limitations described herein or otherwise useful in synthetic organic chemistry.

All references to singular characteristics or limitations of the present invention shall include the corresponding plural characteristic or limitation, and vice-versa, unless otherwise specified or clearly implied to the contrary by the context in which the reference is made. Singular articles such as "a" and "an" and "the" and similar referents in the context of describing the elements are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Thus, numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 1 to 9, from 3.6 to 4.6, from 3.5 to 9.9, and so forth.

All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

As used herein, the term "polarizable electrode" refers to an electrode in an electrochemical cell that is characterized by a discernable charge separation at the electrode-electrolyte boundary. Functionally, because of the charge separation, a polarizable electrode is electrically equivalent to a capacitor. It has very little (near zero) or zero faradic current passing therethrough. (That is, very little or no faradic current exists between the electrode surface and the electrolyte.) The method disclosed herein may use any type of polarizable electrode, without limitation, now known or developed in the future. Preferred polarizable electrode materials include boron doped diamond, tetrahedral amorphous carbon nitride, and tetrahedral amorphous carbon. (By way of contrast, a non-polarizable electrode is an electrode in an electrochemical cell that can be characterized by little or no charge separation at the electrode-electrolyte boundary. Electrochemical cells having non-polarizable electrodes have faradic current that freely passes without polarization. A silver/silver chloride electrode is a classic example of a non-polarizable electrode.)

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

Generally, reference to a certain element such as hydrogen or H is meant to include all isotopes of that element. For example, if an R group is defined to include hydrogen or H, it also includes deuterium and tritium. Compounds comprising radioisotopes such as tritium, $C^{14}$, $P^{32}$ and $S^{35}$ are thus within the scope of the present technology. Procedures for inserting such labels into the compounds of the present technology will be readily apparent to those skilled in the art based on the disclosure herein.

Halogens and "halo" are used herein to refer to Cl, F, Br, and I.

Alkyl groups include straight chain and branched chain alkyl groups having from 1 to 12 carbon atoms, and typically from 1 to 10 carbons or, in some embodiments, from 1 to 8, 1 to 6, or 1 to 4 carbon atoms. Examples of straight chain alkyl groups include groups such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, tert-butyl, neopentyl, isopentyl, and 2,2-dimethylpropyl groups.

Epoxide refers to cyclic ethers containing a single oxygen atom, such as ethylene oxide (i.e., oxirane), oxetane, tetrahydrofuran (i.e., oxolane) tetrahydropyran (i.e., oxane), etc.

Thus, disclosed herein is a method of making epoxides from hydroxy-alkanes, the method comprising, in a reactor comprising an anode and a cathode separated by an ion exchange membrane, and containing a solution comprising water, halogen ions, and a hydroxy-alkane, (a) applying a potential across the anode and the cathode such that a halogenated hydroxy-alkane is produced at the anode as an anolyte and hydroxyl ions are produced at the cathode as a catholyte; and (b) combining the anolyte and the catholyte to yield an epoxide.

In one version of the method, the anode and the cathode comprise boron-doped diamond (BDD) electrodes.

In some versions of the method, the hydroxy-alkane comprises a hydroxy-C2-C12-alkane, or a hydroxy-C2-C6-alkane. In other versions, the hydroxy-alkane comprises a 1-hydroxy-C2-C12-alkane or a 1-hydroxy-C2-C6-alkane.

In still another version of the method, the halogen ions are selected from the group consisting of chloride ions and bromide ions.

In a preferred version, the method occurs within a temperature range of about 20 to about 100° C. or from about 20 to about 80° C.

Step (a) may optionally comprise applying a voltage of from about 1.5 V to about 4.0 V vs Ag/AgCl across the anode and the cathode, or applying a voltage of from about 1.8 V to about 2.3 V across the anode and the cathode.

The solution may comprise from about 0.001 M hydroxy-alkane to about 5.0 M hydroxy-alkane and from about 0.1 M to about 2.0 M halogen ions.

A preferred version of the method is a method of making ethylene oxide from ethanol. The method comprises, in a reactor comprising an anode and a cathode separated by an ion exchange membrane, and containing a solution comprising water, halogen ions, and ethanol, applying a potential across the anode and the cathode such that 2-chloro-ethanol is produced at the anode as an anolyte and hydroxyl ions are produced at the cathode as a catholyte; and combining the anolyte and the catholyte to yield ethylene oxide.

I. IN GENERAL

This invention is not limited to the particular methodology, protocols, materials, and reagents described, as these may vary. The terminology used in this disclosure is for the purpose of describing particular embodiments only and is not intended to limit the scope of the present invention, which will be limited only by the language of the appended claims.

As used in this disclosure and in the appended claims, the singular forms "a", "an", and "the" include plural reference unless the context clearly dictates otherwise. The terms "a" (or "an"), "one or more" and "at least one" can be used interchangeably. The terms "comprising", "including", and "having" can also be used interchangeably.

Unless defined otherwise, all technical and scientific terms used in this disclosure, including element symbols, have the same meanings as commonly understood by one of ordinary skill in the art. Chemical compound names that are commonly used and recognized in the art are used interchangeably with the equivalent IUPAC name.

All publications and patents specifically mentioned in this disclosure are incorporated by reference for all purposes.

II. THE METHOD

We disclose herein a general strategy to, for example but not limited to, effect the electrochemical halogenation, partial oxidation, dehydrogenation, and/or epoxidation of alkanes to olefins and/or epoxides. The process is mediated through the electrochemical halogenation of alkanes, followed by an electrochemically-driven halide elimination step leading to, for example but not limited to, alkenes, epoxides, alcohols, acids, aldehydes, and nitriles at ambient conditions.

The reaction may take place in an electrochemical cell which can employ a liquid, polymeric, or solid-state ion conductor. Due to the gaseous state of the reactants and products under ambient conditions, gas diffusion electrodes (GDE) are preferred as both the anode and cathode. GDEs establish a three-phase boundary between the electrolyte, catalysts, and gas phase, allowing for the rapid transport of gaseous species. This is not mandatory, however; just preferred. Standard electrodes may also be used with good success.

Figure 2:
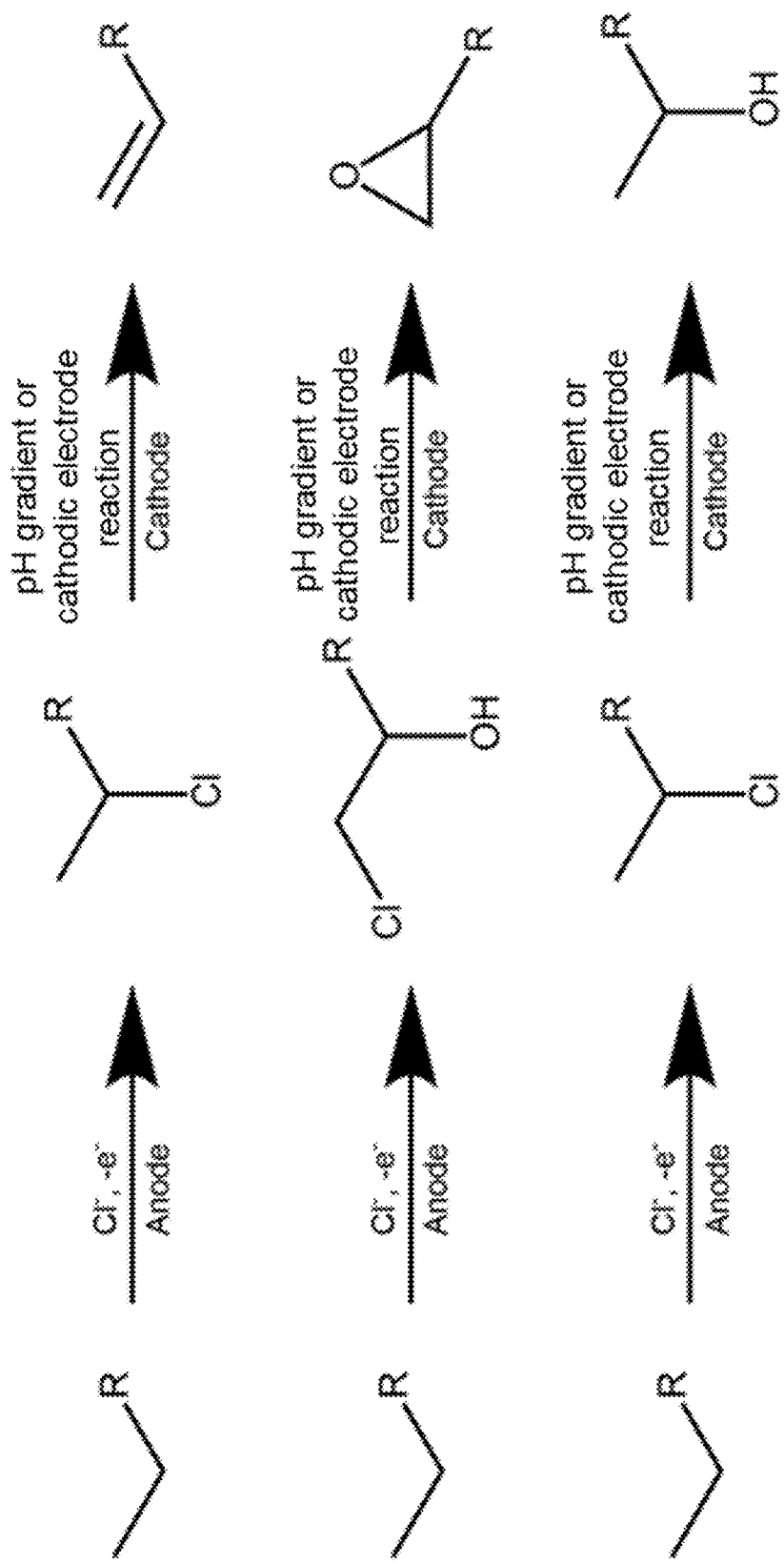
FIG. 2 shows reaction schemes for three exemplary upgrading reactions that can be achieved using the disclosed systems and methods.

In a non-limiting example, at the anode, the substrate alkanes are electrohalogenated and partially oxidized using an outer-sphere electrochemical ionic or radical process or a catalyzed electrohalogenation reaction (see FIG. 1). The thus formed haloalkanes then migrate through the electrolyte to the cathode, where dehydrohalogenation leads to the formation of the corresponding olefin or epoxide from the haloalkane, as well as partially oxidized haloalkane (such as chlorohydrin) (FIG. 1). The elimination, epoxidation, or substitution reaction (see FIG. 2) is facilitated by the alkaline environment created at the cathode surface due to the hydrogen evolution reaction. Product alkenes, epoxides, or substituted products (see FIG. 2) readily leave the cell through the secondary gas diffusion electrode (FIG. 1). At the same time, halide ions shuttle from the cathode to the anode, while protons migrate from the anode to the cathode, mediating the current flow in the electrolyte (FIG. 1). The reactions occur in a common electrolyte and are carefully flux matched to allow for continuous operation of the cell.

The following example is offered for illustrative purposes only and is not intended to limit the scope of the invention in any way. Indeed, various modifications of the invention in addition to those shown and described herein will become apparent to those skilled in the art from the foregoing description and the following Example and fall within the scope of the appended claims.

III. EXAMPLES

Example 1—Electrochemical Dehydrogenation of Light Alkanes and Extensions Thereof Summary of the Example:

In this example, we outline general strategies for the electrochemical dehydrogenation of light alkanes to olefins. This is mediated through the electrochemical halogenation of alkanes, followed by an electrochemically-driven halide elimination step, leading to alkenes at ambient conditions. These reactions, which are guided by mechanistic insight, allow for alkane dehydrogenation solely using electricity as the driving force. The principles outlined in this example are generally applicable to the electrochemical activation of C—H bonds in contexts beyond dehydrogenation, as described further herein.

Introduction:

Light olefins are crucial building blocks for numerous chemical products. Traditionally, they are obtained from naphtha, but cheap supplies of shale gas make naphtha cracking obsolete. Therefore, olefins are increasingly produced by the dehydrogenation of alkanes over Pt or CrOx catalysts. (Sattler, J. J. H. B., Ruiz-Martinez, J., Santillan-Jimenez, E. & Weckhuysen, B. M. Catalytic Dehydrogenation of Light Alkanes on Metals and Metal Oxides. Chem. Rev. 114, 10613-10653 (2014) and Sanfilippo, D. & Rylander, P. N. Hydrogenation and Dehydrogenation. In Ullmann's Encyclopedia of Industrial Chemistry (Wiley-VCH Verlag GmbH & Co. KGaA, 2009).) However, this process is inefficient because of its high operating temperature (500-700° C.), which leads to large amounts of waste heat. In theory, oxygen co-feeding could shift the equilibrium to lower temperatures by consuming the generated hydrogen. In practice, however, the presence of oxygen leads to overoxidation of alkenes to CO and $CO_2$. Grant, J. T. et al. Selective oxidative dehydrogenation of propane to propene using boron nitride catalysts. Science 354, 1570-1573 (2016). This temperature and selectivity paradox is fundamental in nature and therefore needs entirely novel approaches to be overcome.

Electrochemical methods can resolve these issues. In an electrochemical approach to dehydrogenation, hydrogen is removed from alkanes in the form of protons. The driving force for this reaction fundamentally, a gradient in proton potential, is established and precisely controlled by the electrochemical field. It can thus take place at ambient temperature and pressure. Under these conditions, the dehydrogenation of propane to propene ($\Delta G_r$=+86 kJ mol$^{-1}$), for example, becomes favorable at a cell potential of 0.45 V. As a comparison, 1.23 V is required to split water into hydrogen and oxygen. Indeed, a recent report used electrochemistry to enhance high-temperature dehydrogenation. 4. Ding, D. et al. A novel low-thermal-budget approach for the co-production of ethylene and hydrogen via the electrochemical non-oxidative deprotonation of ethane. Energy Environ. Sci. 11, 1710-1716 (2018). However, the direct electrochemical dehydrogenation of alkanes at ambient conditions has not been reported. This is not surprising since it requires catalysts to preferentially bind alkanes over olefins, while the opposite is generally the case.

Figure 3:
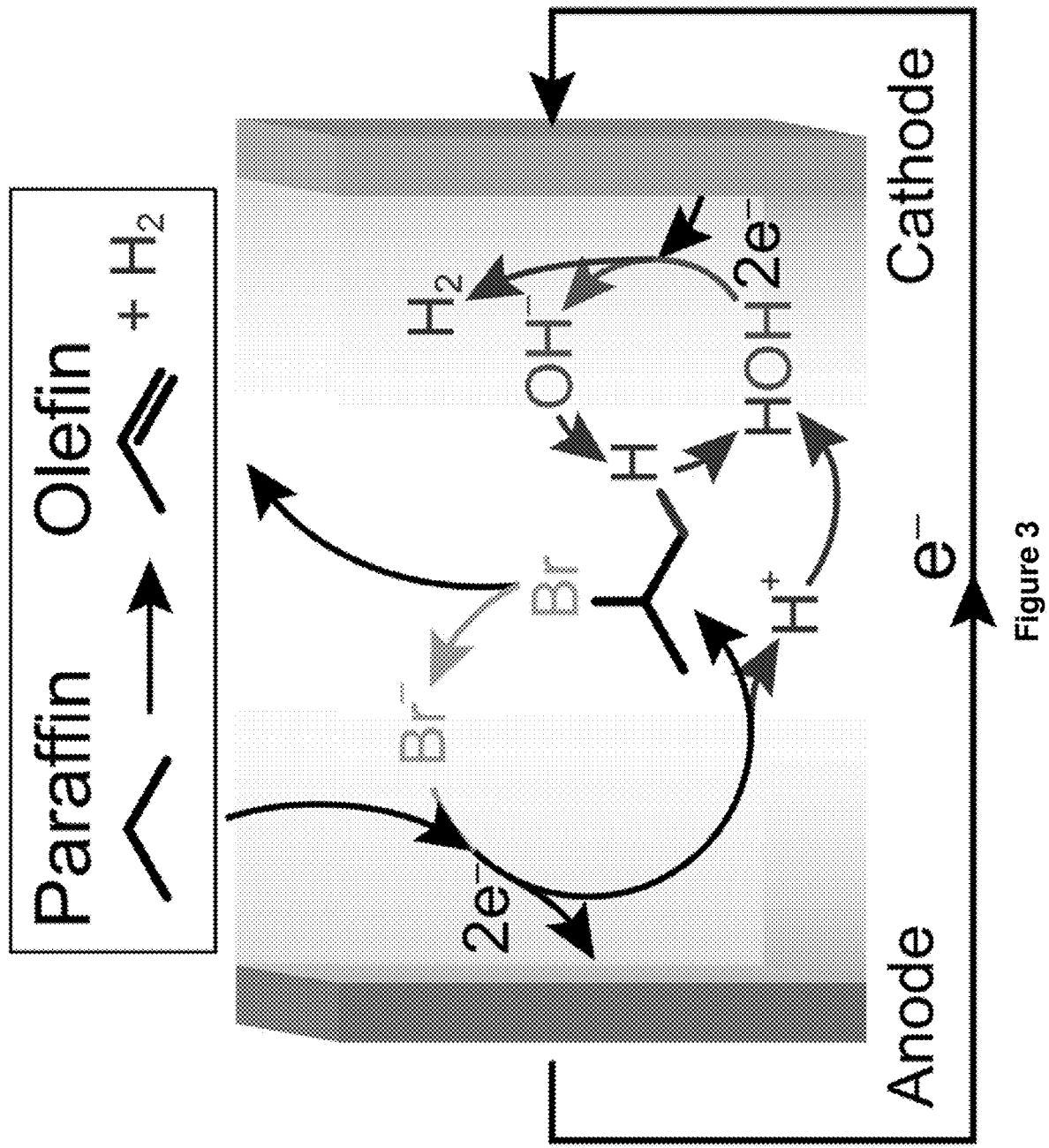
FIG. 3 is a closed-cycle scheme for the haloalkane-mediated electrochemical dehydrogenation.
Figures 4A, 4B:
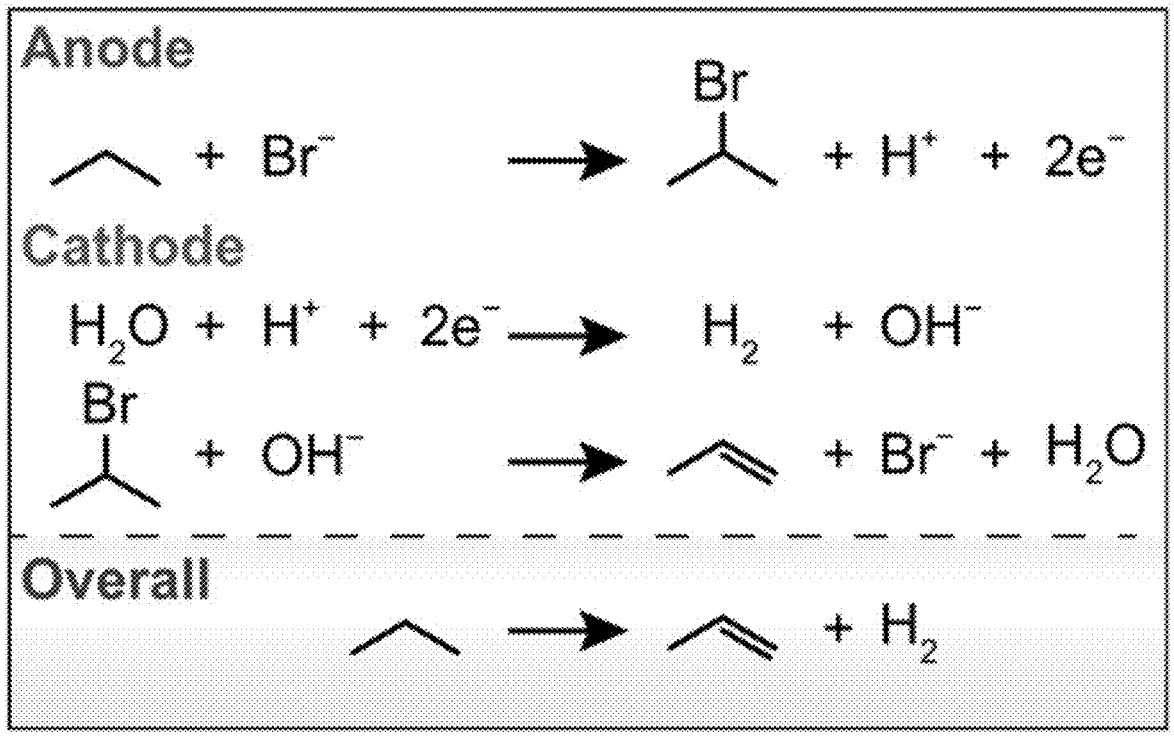
FIG. 4A illustrates the stoichiometry of electrochemical dehydrogenation through haloalkanes.
FIG. 4B shows dissociation energies relevant to electrochemical dehydrogenation through haloalkanes.

To circumvent this problem, we propose the electrochemical dehydrogenation of short-chain alkanes through a two-step process, involving the electrosynthesis of a haloalkane intermediate. Haloalkanes, which are valuable in their own right, are subsequently transformed to olefins through an electrochemical halide elimination step. This concept, which forms a closed cycle, is schematically illustrated in FIG. 3 and its detailed stoichiometry is shown in FIG. 4A. Our approach enables the spatial separation of paraffin oxidation from olefin generation, thereby not only solving the need for high temperatures but also avoiding product overoxidation.

Figure 4C:
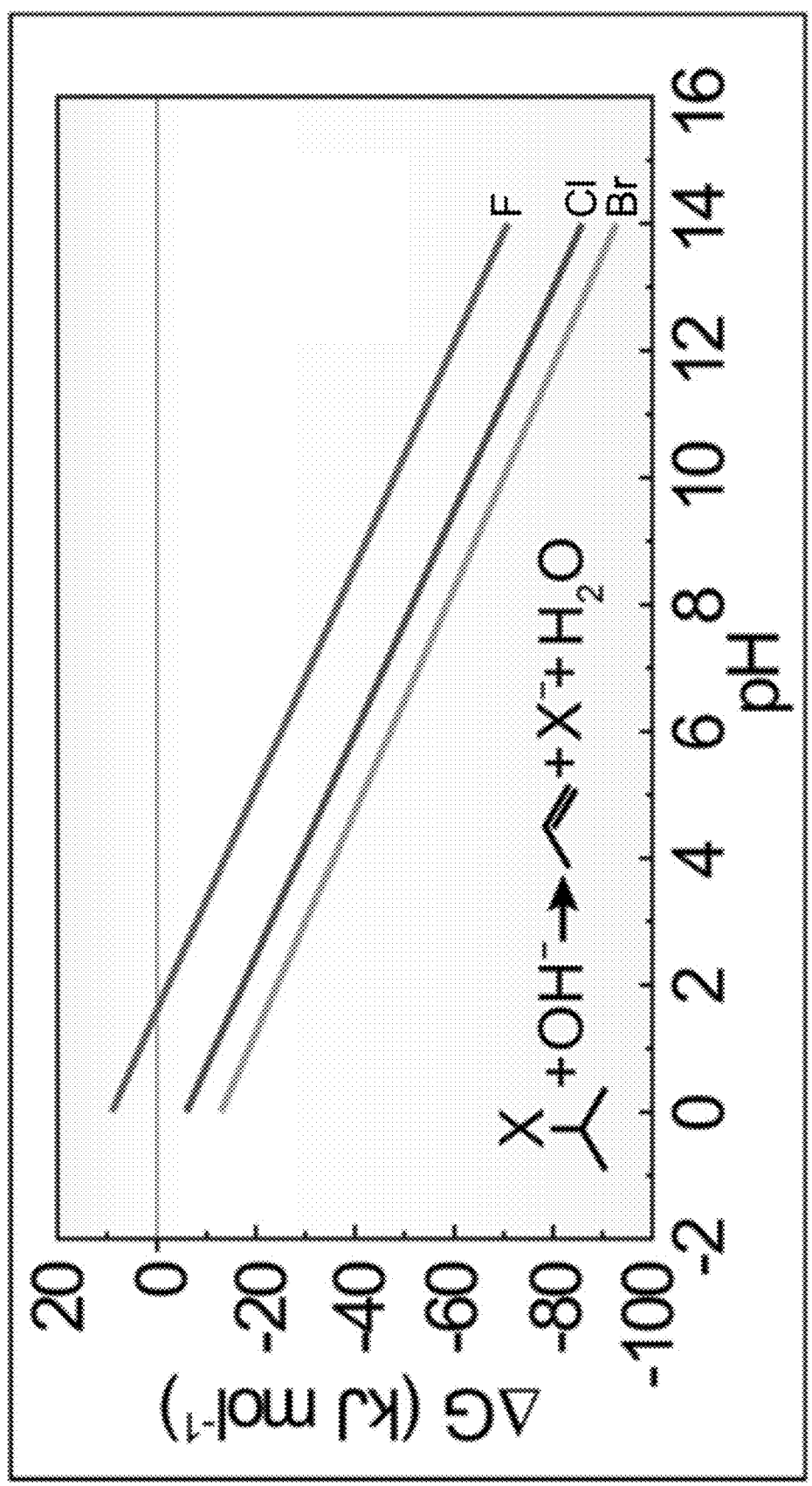
FIG. 4C is a graph showing elimination thermodynamics relevant to electrochemical dehydrogenation through haloalkanes as a function of pH.

To select the appropriate haloalkane intermediate, we must consider thermodynamic factors. Indeed, the activation of alkanes by halogenation is subject to a fundamental trade-off between the ease of haloalkane synthesis and their reactivity. For example, while fluoroalkanes can be readily synthesized electrochemically, the high strength of the C—F bond makes fluoroalkanes largely inert towards further reaction (FIG. 4B). In contrast, bromoalkanes are more readily transformed to other products, but the weak C—Br bond makes their synthesis more challenging. This correlation is visible in FIG. 4C, which depicts the thermodynamic driving force towards halide elimination as a function of pH.

This disclosure thus centers on bromo- and chloroalkanes intermediates. In a first step, we will perform the electrochemical synthesis of short-chain haloalkanes. Subsequently, we will transform the haloalkanes to olefins in electrochemically generated pH gradients. Finally, we will design a flux-matched electrochemical cell which transforms short-chain alkanes to olefins at ambient conditions, solely using electricity as the driving force.

The insights generated in these experiments will generally be applicable to the electrochemical activation of C—H bonds and will form the basis for further refining the disclosed systems and methods.

More Details of Steps Outlined Above:

In sum, this example is broken down into the following steps: 1) Investigation of the electrochemical halogenation of short-chain alkanes. 2) Promotion of haloalkane elimination by electrochemical pH gradients. And 3) Design of a flux-matched cell for the electrochemical dehydrogenation of alkanes.

Step 1a): Electrochemical Radical Halogenation of Short Chain Alkanes (Outer Sphere):

In this first step, we investigate the electrochemical halogenation of short-chain alkanes through electrochemically generated halogen radicals. 'Polarizable' anode materials, for example boron-doped diamond (BDD), mediate the outersphere generation of incipient halogen radicals (Ferro, S. et al. Chlorine Evolution at Highly Boron-Doped Diamond Electrodes. J. Electrochem. Soc. 147, 2614-2619 (2000) and Marselli, B., Garcia-Gomez, J., Michaud, P.-A., Rodrigo, M. A. & Comninellis, C. Electrogeneration of Hydroxyl Radicals on Boron-Doped Diamond Electrodes. J. Electrochem. Soc. 150, D79-D83 (2003)), while avoiding the evolution of oxygen, as well as the inner-sphere interaction with alkanes. We therefore expect radical halogenation processes to take place at their surface under ambient conditions. In choosing this strategy for the synthesis of haloalkanes, we will answer the following questions: (1) How selectively can electrochemically generated radicals halogenate short-chain alkanes? (2) How does the nature of the alkane and the halide, as well as mixtures thereof, impact the selectivity and activity of halogenation? (3) What is the mechanistic profile of the reaction and does direct electron transfer from the alkane take place at higher driving force? (4) What is the role of the reaction medium (electrolyte, cation effects, pH, and solvent type) in modulating the selectivity of alkane halogenation?

To address these questions, we will use on-line MS and NMR analyses to characterize the product distribution generated from the oxidation of mixtures of alkanes and halides at BDD electrodes. After investigating water as a matrix (see below for solubility data), we will expand our studies to nonaqueous electrolytes, where we expect the complete suppression of pernicious OH radical generation which may lead to substrate overoxidation. (Marselli, B., Garcia-Gomez, J., Michaud, P.-A., Rodrigo, M. A. & Comninellis, C. Electrogeneration of Hydroxyl Radicals on Boron-Doped Diamond Electrodes. J. Electrochem. Soc. 150, D79-D83 (2003). Investigations of the electrochemical kinetics—specifically the reaction orders in halide and alkane, as well as Tafel analysis for each product—will guide the optimization of halogenation selectivity.

Figure 5:
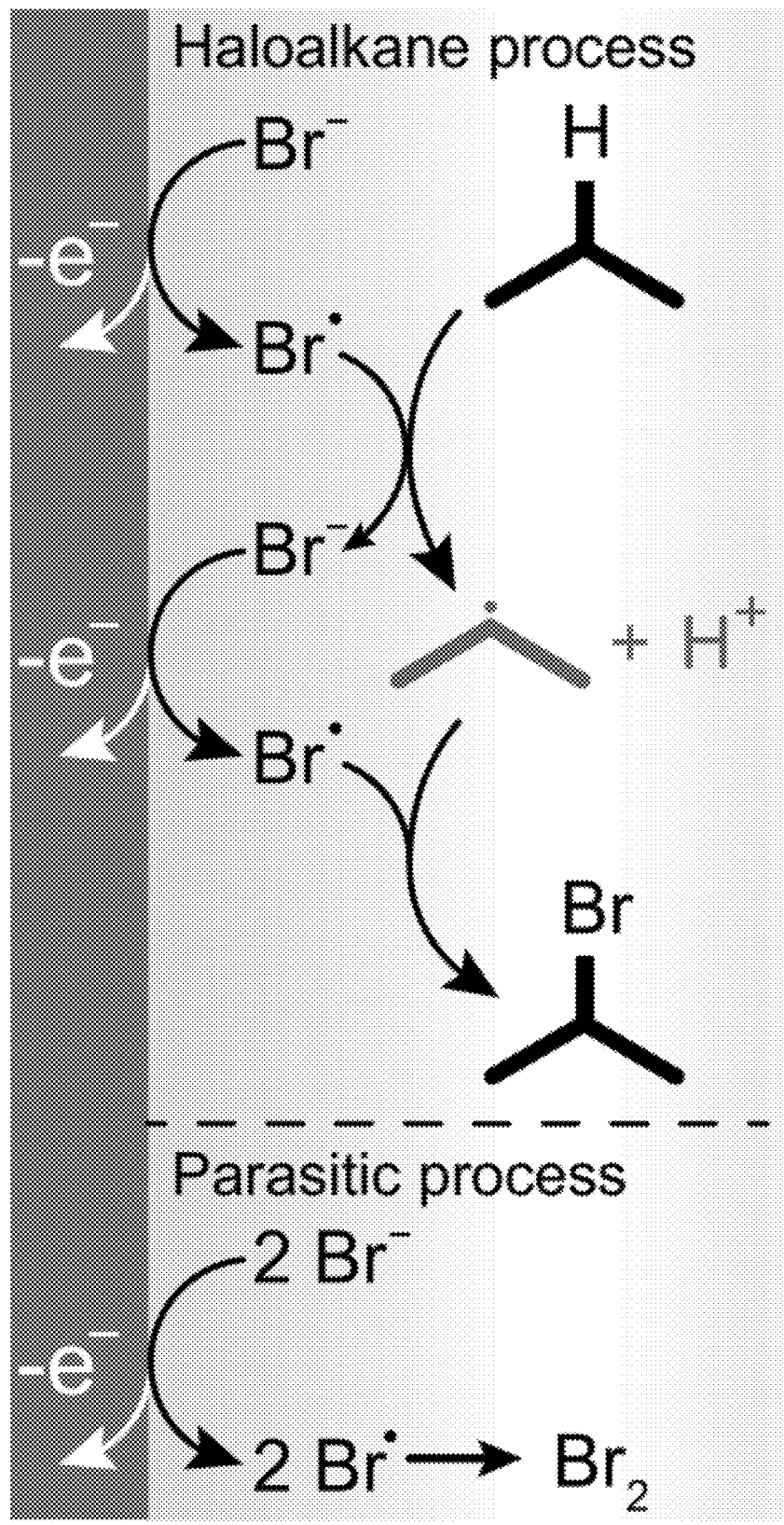
FIG. 5 illustrates radical electrochemical halogenation pathways.

For example, we expect unwanted dihalogen formation to be second order in halide, while H abstraction and radical recombination should both be first order (FIG. 5). Therefore, we expect increased selectivity for monohalogenation upon decreasing the halide concentration relative to the substrate alkanes. We also expect direct oxidation of alkanes to set in at high driving force, which we expect to lead to a changed halogenation mechanism and be reflected in the Tafel data. Our studies will lead to novel insight into the interfacial reactivity of electrogenerated halide radicals and will allow the direct electrochemical halogenation of shortchain alkanes through an outer-sphere mechanism.

Step 1b): Surface-Mediated Electrochemical Halogenation of Short Chain Alkanes (Inner Sphere):

In a next step, we will study surface-mediated electrohalogenation pathways, which do not involve high-energy radical intermediates. It is known that halides electrochemically adsorb onto platinum group metals at low driving force. (Gasteiger, H. A., Markovic, N. M. & Ross, P. N. Bromide Adsorption on Pt(111): Adsorption Isotherm and Electrosorption Valency Deduced from RRDPt(111)E Measurements. Langmuir 12, 1414-1418 (1996).) The same surfaces also activate alkanes in electrochemical processes. We thus propose that electrohalogenation of alkanes on strongly interacting platinum group metal (PGM) surfaces (such as Pt, Pd and Ru) takes place through the reaction of electrosorbed halogens with dissociatively bound alkanes in a Langmuir-Hinshelwood reaction.

Figure 6:
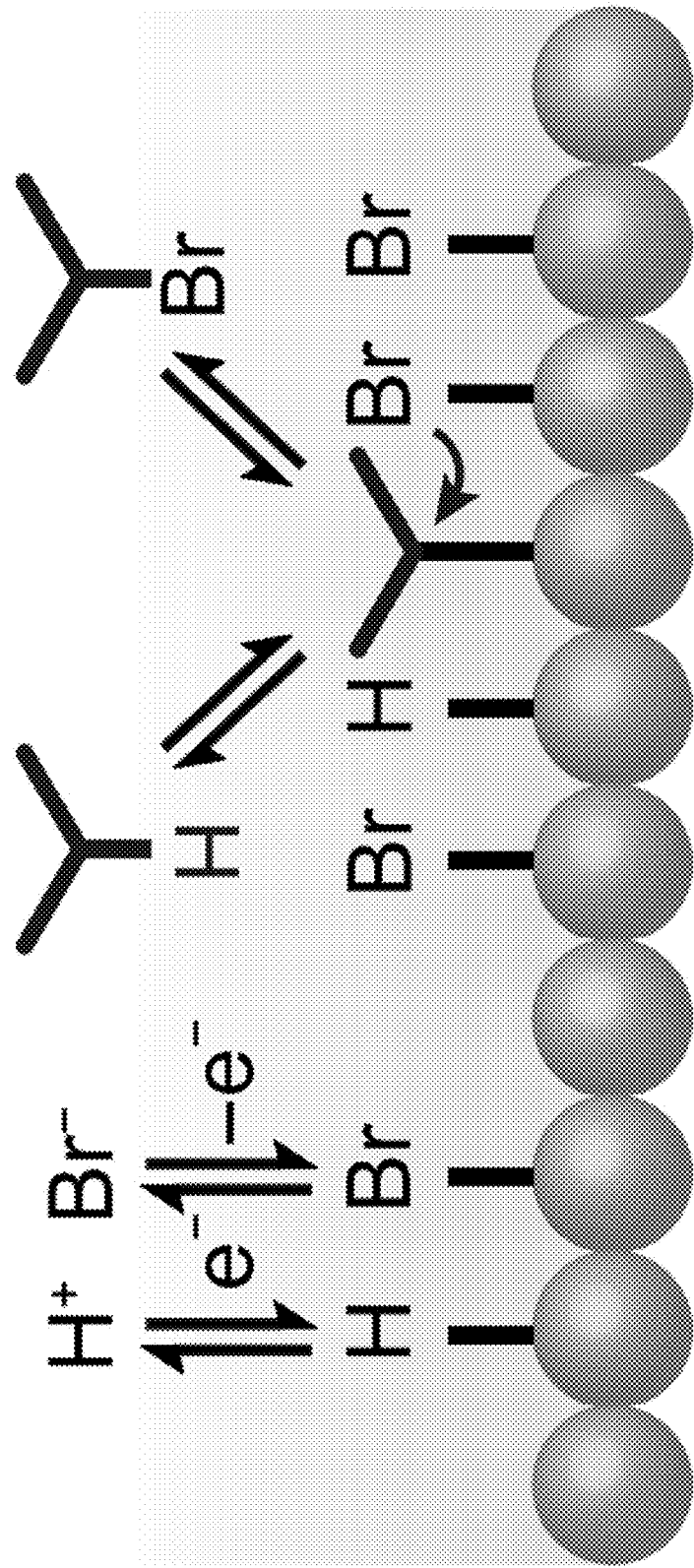
FIG. 6 illustrates equilibria in the inner-sphere halogenation of alkanes on a platinum group metal (PGM) surface.

A schematic of the involved equilibria is shown in FIG. 6. Because electrochemical alkane binding is poorly understood, we will apply a bottom-up approach to investigate its chemistry. This will be achieved by leveraging differential electrochemical mass spectrometry (DEMS), which can quantify electrochemical sub-monolayer adsorption and desorption processes. (Baltruschat, H. Differential electrochemical mass spectrometry. J. Am. Soc. Mass Spectrom. 15, 1693-1706 (2004) and Trimarco, D. B. et al. Enabling real-time detection of electrochemical desorption phenomena with sub-monolayer sensitivity. Electrochimica Acta 268, 520-530 (2018).)

Our investigations will be carried out on single-crystal PGM electrodes, which we obtain from commercial sources or prepare by well-established methods. Cuesta, A., Kibler, L. A. & Kolb, D. M. A method to prepare single crystal electrodes of reactive metals: application to Pd(hk1). J. Electroanal. Chem. 466, 165-168 (1999). The interaction of alkanes with electrode surfaces will be investigated by measuring their electrode-mediated H/D exchange at varying potentials, (Sattler, A. Hydrogen/Deuterium (H/D) Exchange Catalysis in Alkanes. ACS Catal. 8, 2296-2312 (2018)), as well as their potential-dependent adsorption and desorption. Muller, U., Dulberg, A. & Baltruschat, H. Coadsorption, non-reactive displacement and cathodic desorption of ethene preadsorbed on Pd and Pt electrodes. Colloids Surf. Physicochem. Eng. Asp. 134, 155-164 (1998).

Dissociative alkane binding is thermally activated and we thus expect a strong temperature dependence for this reaction. Consequently we will expand our investigations to high-boiling and stable solvents such as propylene carbonate.

In separate experiments, we will establish halide adsorption isotherms using chronocoulometric methods. (Adrian W. Bott, William. R. Heineman. Chronocoulometry. Curr. September 20, 121-126 (2004).) These experiments will provide an overview of the thermochemistry of halide and alkane interaction with PGM surfaces. Specifically, we will obtain temperature and potential-dependent isotherms of halide and alkane adsorption on PGM surfaces, revealing reaction conditions for the electrode-mediated halogenation of alkanes.

We will next investigate the combined electrochemical reactivity of alkanes and halides. Thereby we target reaction conditions and temperatures, where both halides and alkanes are reversibly bound to the electrode and therefore promote the generation of haloalkanes through an equilibrium process. Products will be quantified by MS and our studies will be complemented by kinetic analysis of halide and alkane reaction orders, as well as H/D kinetic isotope effects for different proton sites on the alkanes. These measurements will allow us to pinpoint rate-determining steps in the surface-mediated halogenation process. For example, a reaction which is governed by equilibrium populations of alkane and halide will be first order in both and exhibit an electrochemical transfer coefficient of 2, indicative of the transfer of two electrons ahead of the rate-determining step. In addition, in-situ IR experiments will be used to determine the binding mode of alkanes at electrode surfaces and exchange with isotopically labelled alkanes will be used to distinguish spectators from catalytically active species.

Together, our studies will provide unprecedented insight into the combined electrochemical dynamics of halides and alkanes on electrode surfaces and will a path to inner-sphere alkane halogenation reactions at low overpotentials. Furthermore, these studies will serve as the foundation for future studies on the electrochemical reactivity of C—H activation processes.

Step 2): Promotion of Dehydrohalogenation by Electrochemical pH Gradients:

Elimination reactions allow for the synthesis of olefins from haloalkanes, but require an alkaline environment to take place. In fact, electrochemistry readily generates pH gradients that can mediate this reaction. The hydrogen evolution reaction (HER) consumes protons, leaving behind an excess of hydroxide ions near the electrode surface. Importantly, this effect can be rather strong. Indeed, in weakly buffering electrolytes, pH changes of 3 units relative to the bulk were observed at currents of only 4.5 mA cm$^{-2}$.[16] Furthermore, a local pH as high as 14 was reported for unbuffered water at 100 mA cm. Kuhn, A. T. & Chan, C. Y. pH changes at near-electrode surfaces. J. Appl. Electrochem. 13, 189-207 (1983).

Figure 7:
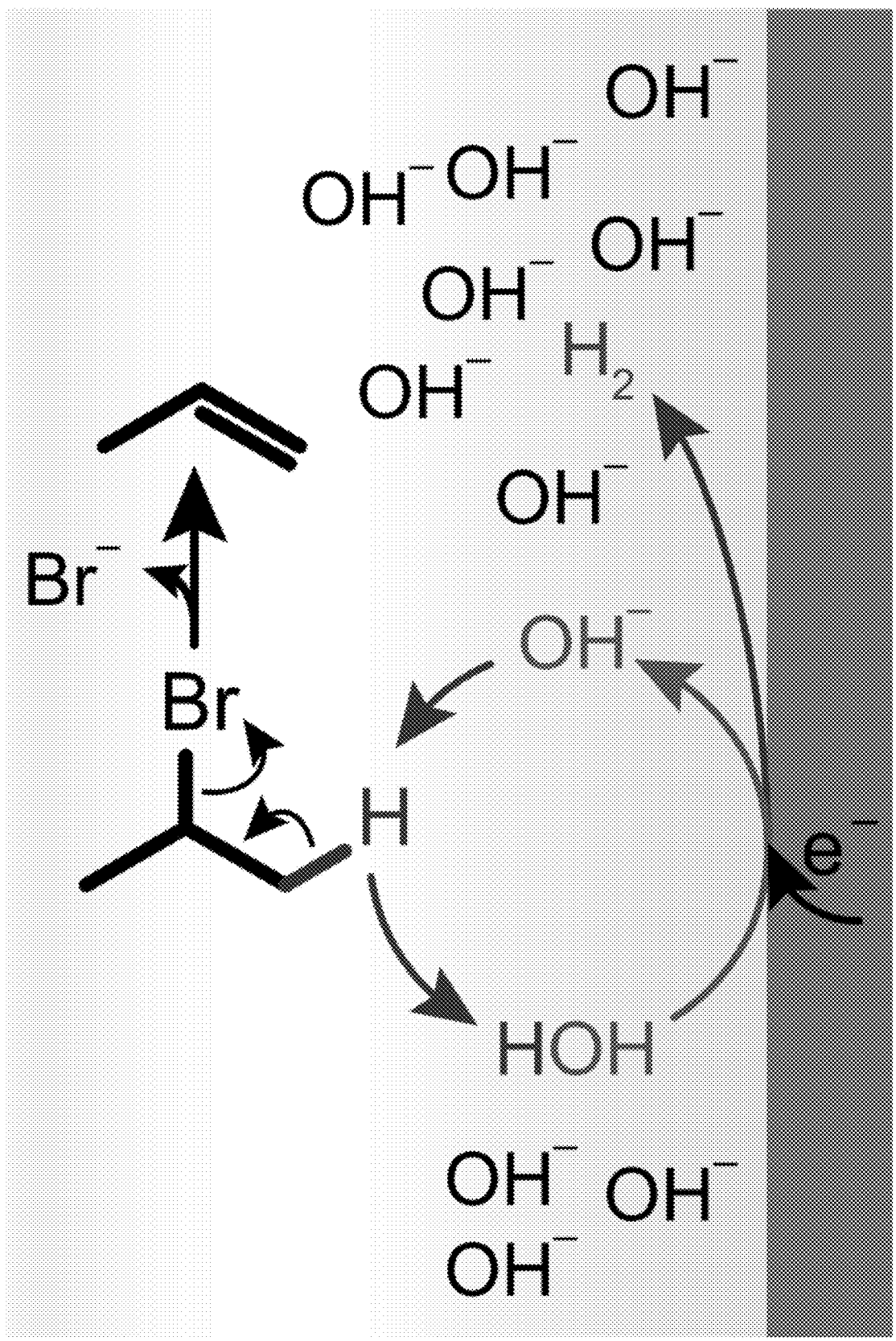
FIG. 7 illustrates an elimination reaction driven by an electrochemical pH gradient.

This phenomenon has a profound impact on electrochemical processes, leading, for example, to detrimental 'concentration overpotentials' and modifications to the product distribution. We herein propose to leverage this effect for mediating the dehydrohalogenation of haloalkanes to olefins as shown in FIG. 7.

We will investigate the reactivity of short-chain haloalkanes in the presence of a hydrogen-evolving electrode material. Products will be analyzed using NMR spectroscopy and online mass spectrometry. We will focus on the role of electrolyte composition and electrode structure in influencing the product distribution of these reactions. Indeed, a number of reaction pathways can be active under these conditions, which we will have to carefully monitor and manipulate. These include elimination (E1, E2) and substitution ($S_N1$, $S_N2$) reactions; the direct reaction of haloalkanes with the electrode; and the reduction of alkenes at the electrode surface. Our studies will interrogate strategies to control the selectivity among these processes, in order to favor halide elimination to form alkenes with quantitative selectivity. In fact, we expect that the rate of substitution and elimination reactions, as well as the alkalinity near the electrode surface, will be influenced by the electrolyte solvent and composition.

Due to the complex dynamics of this system, our observations will be supported by computational simulations of the pH gradient and local reaction rates using tools such as Kinetiscope. In particular, we will experimentally investigate and develop models for the role of electrode porosity, solvent properties, current density, as well as the impact of convection and the nature of the haloalkane in governing alkene selectivity.

Step 3): Design of a Miniature Gap Reactor for Electrochemical Alkane Dehydrogenation with Perfect Atom-Economy:

Based on the work conducted in steps 1 and 2, we will assemble an electrochemical cell that achieves continuous dehydrogenation of alkanes at ambient conditions. This device consists of a haloalkane-producing anode and a pH gradient-generating cathode. Both electrodes will be separated by a minimal distance, allowing for efficient diffusion of the haloalkane from the anode to the cathode of the cell. Importantly, both reactions need to operate in a common electrolyte and need to be carefully flux-matched.

Many short-chain paraffins of industrial relevance, as well as their olefin analogs, are in a gaseous state near ambient conditions. (See U.S. Pat. No. 9,353,074.) We will thus employ gas diffusion electrodes (GDE) as both the anode and cathode. GDEs establish a three-phase boundary between the electrolyte, catalysts and gas phase, allowing for the rapid transport of gaseous species. Both electrodes will be separated by a thin layer of electrolyte.

At the anode, the substrate alkanes will be electrohalogenated. These incipient haloalkanes then migrate through the electrolyte to the cathode, where dehydrohalogenation leads to the formation of the corresponding olefin. Product alkenes will readily leave the cell through the secondary gas diffusion electrode. At the same time, halide ions will shuttle from the cathode to the anode, while protons migrate from the anode to the cathode, mediating the current flow in the electrolyte.

The choice of electrolyte solvent will thus be of great importance. Ideally, haloalkane solubility should be higher than the solubility of the substrates and products, so as to avoid their crossover through the cell and escape of unconverted haloalkane. This condition is satisfied for water, where propane (75 mg $L^{-1}$) and propene (384 mg $L^{-1}$) are substantially less soluble than 2-bromopropane (3.2 g $L^{-1}$). Nonetheless, mixtures with organic solvents will be tested in order to increase haloalkane solubility and thus improve diffusive transport. The integrated process is schematically depicted in FIG. 1.

It is apparent that this design will require careful matching of the fluxes of halide, alkane, haloalkane, and protons. After construction of a prototype, our efforts will be directed to understanding the dynamic behavior of this system and its stable operating conditions. For example, upon start-up, we expect excess production of hydrogen while haloalkanes are accumulating in the cell. At steady-state, however, nominally all of the produced hydrogen is derived from electrochemical paraffin dehydrogenation and the haloalkane concentration reaches an equilibrium.

To gain an understanding of the interplay of different reaction rates, we will characterize the concentrations of species in the reactor at different points in time and correlate these measurements with simulations of the complete process. Furthermore, we will quantify the efficiency of haloalkane and halide transport through the electrolyte, which is a potential bottleneck to device operation. Taken together, these measurements and rate matching will ensure that all incoming paraffin is converted to a single olefin product, while avoiding the excess production of haloalkane (if dehydrohalogenation is incomplete) or the generation of polyhalogenated compounds (if the residence time of haloalkanes is too long).

The energy efficiency of our process will be of central importance to its practical relevance. Indeed, the formation of haloalkanes as intermediate species is the key efficiency limiting factor. If the haloalkanes are substantially higher in energy than the alkenes, this step will require an excess energy input which will be lost upon formation of the olefin. We will influence this parameter by tuning the energy of solvation of the halide ion, which controls the exergonicity of the elimination reaction.

Summary:

In this example, we have described a general strategy for the electrochemical dehydrogenation of alkanes at ambient conditions. The insight gained in this work will provide a foundation for focusing on electrochemical substitutes for traditional C—H activation methods. For example, we can extend the principles detailed above to other reaction classes such as the electrode-mediated oxidation of ethane to ethylene oxide. Therein we will target the electrochemical synthesis of 2-chloroethanol in a water-mediated radical process, followed by its dehydrochlorination to ethylene oxide at the counter electrode. We will also extend our understanding of inner-sphere C—H activation on electrode surfaces, targeting their direct activation and transformation. By activating C—H and C—C bonds using novel electrochemical methods, we will access previously uncharted reaction manifolds and decarbonize chemical manufacturing by driving chemical transformations using renewable energy.

Example 2—Electrochemical Synthesis of Chlorohydrin from Ethanol

Summary of the Example:

In this example, we demonstrate the successful application of the general strategies disclosed in this application to the synthesis of a chlorohydrin product from an ethanol reactant. Accordingly, it is expected that the disclosed systems and methods can be successfully applied to a broad range of substrates to produce a wide variety of desired chemical products.

Chlorohydrin Synthesis: All experiments were carried out at room temperature in a glass H-Cell cleaned with piranha using an Interface 1010E potentiostat. (Gamry Instruments, Warminster, Pennsylvania.) Potentials are measured against a leakless Ag/AgCl reference electrode (eDAQ Inc., Colorado Springs, Colorado) and are iR corrected using the current interrupt method. A platinum wire was used as the counter electrode. MilliQ water was used in all electrolytes and rinsing steps. The electrolyte used is 0.1 M perchloric acid (60-62%, Alfa Aeser, Tewksbury, Massachusets), 0.6 M $NaClO_4$ (99.5% Alfa Asear), and 0.5 M NaCl (99.5% Acros Organics, Geel, Flanders, Belgium).

A boron doped diamond electrode (Fraunhofer USA, Plymouth, Michigan) was attached to a titanium current collector and masked with Kapton tape to give an exposed area of 0.42 $cm^2$. The BDD electrode was conditioned prior to use by 5 cycles of cyclic voltammetry from 0 V to +3 V at a scan rate of 10 mV/s in 0.5 M sulfuric acid (Sigma Aldrich, St. Louis, Missouri). Following conditioning the electrode was thoroughly rinsed with MilliQ water. A selective membrane (Selemion DSV, Bellex International Corporation, Wilmington, Delaware) was added between the working electrode and counter electrode compartments. The cell was filled with the electrolyte and dosed to 25-100 mM ethanol (190 proof, Decon Labs, King Of Prussia, Pennsylvania). The solution was sparged with argon (Airgas, Radnor Township, Pennsylvania) and held at +2.05 V for 4 to 10 hours.

Analysis: Liquid analysis was performed on the electrolyte after electrolysis by NMR spectroscopy using a Watergate w5 technique to suppress the signal of water. An Avance 600 Spectrometer (Bruker, Billerica, Massachusets), equipped with TCI-F CryoProbe (Bruker) was used. Samples were prepared by adding one hundred microlitres of 150 µM dimethylsulfoxide in D20 to 250 µl of sample and 250 µl of MilliQ water in a high-field NMR tube (Wilmad Labglass, Elk Grove Village, Illinois). NMR spectra were Fourier-transformed with 0.5 Hz apodization and baseline-corrected using a third order polynomial in "MestReNova"-brand software (Mestralab Research, Compostela, Spain) Spectra were referenced to the DMSO at 2.71 ppm.

Figure 8:
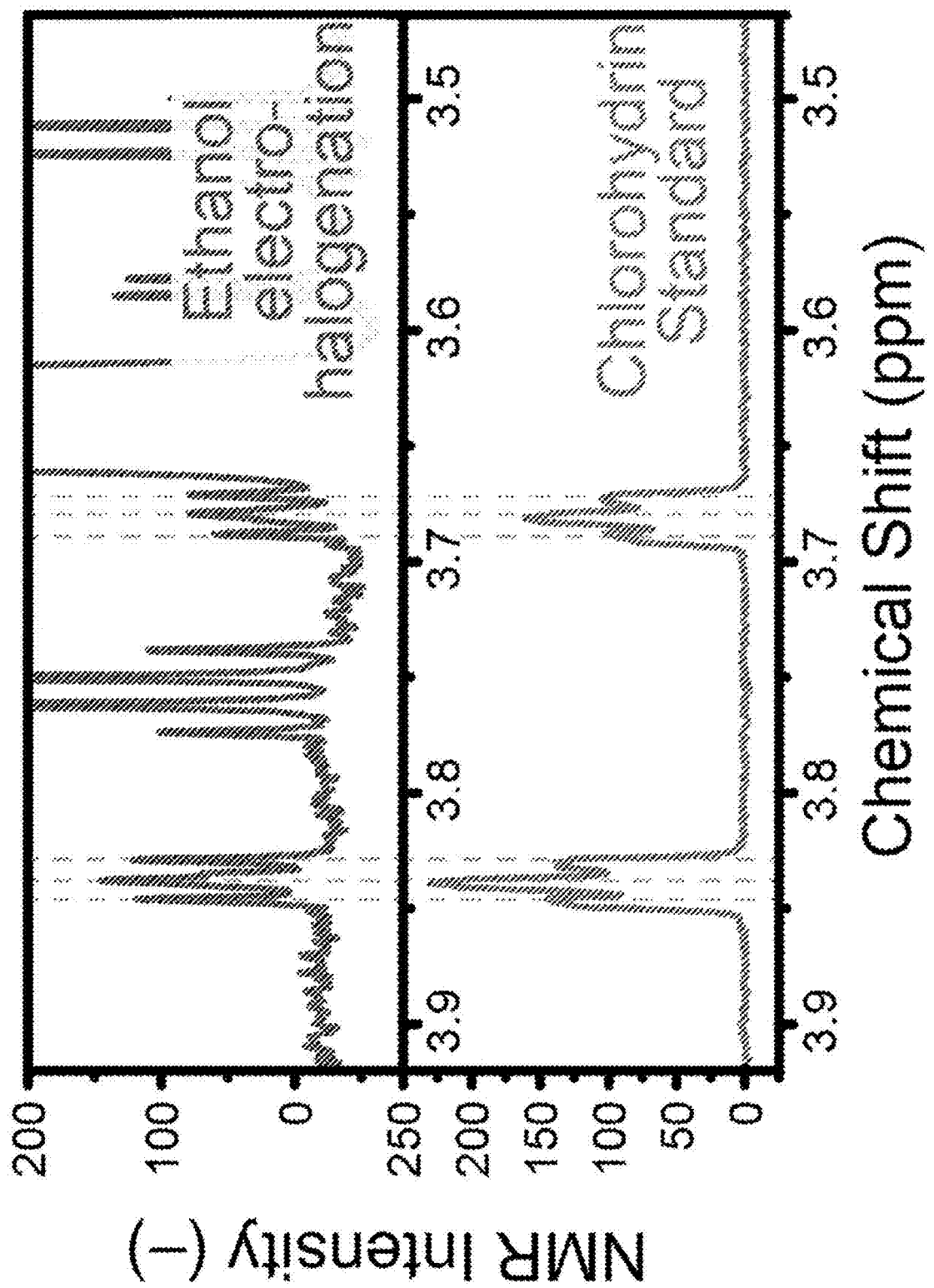
FIG. 8 shows nuclear magnetic resonance (NMR) spectra of a sample after ethanol electrohalogenation (top panel) and a chlorohydrin standard (bottom panel).

As seen in FIG. 8, the NMR spectra confirmed the production of chlorohydrin product form the ethanol reactant.

Example 3—Electrochemical Synthesis Directly Driven by Electron Transfer from the Cathode In this example, we report that the transformation of haloalkanes to alkenes and epoxides can actually be directly driven by electron transfer from the cathode, as an alternative to this reaction taking place through OH⁻ ions which are generated at the cathode, as described above (see FIG. 2).

In further experiments, we demonstrated that this transformation can take place through electron transfer at or on the electrode surface. Without being bound by any hypothesis or theoretical mechanism of action, the reaction may be catalyzed by silver but potentially also by other electrocatalyst materials as well as by outer-sphere electron transfer.

Example 4: Steering the Selectivity of Ethanol Halogenation

To explore the radical halogenation of ethanol, chlorine radicals were generated using a boron doped diamond (BDD) electrode. The selective generation of chlorine radicals in aqueous solutions requires a highly polarizable electrode because Cl· formation (E°=2.43 V vs SHE) occurs at potentials which are more oxidative than the equilibrium potential of $O_2$ evolution (E°=1.23 V vs SHE). BDD electrodes respond to this need by suppressing oxygen production, while maintaining a low overpotential for chloride oxidation. Furthermore, BDD electrodes have been shown to mediate the outer-sphere generation of halogen radicals while avoiding interaction with alkanes. In a first step, we measured the activity of the BDD electrodes toward chloride oxidation using cyclic voltammetry. All experiments were performed in a glass cell divided by an anion exchange membrane. BDD was used as anode and a platinum wire as counter electrode. Potentials were measured against an Ag/AgCl (3.4 M KCl) reference electrode. The BDD electrodes were conditioned by 5 repeats of a 10 second potential hold at +3.0 V followed by a 10 second hold at −3.0 V. Chloride oxidation started at approximately +1.7 V in a sodium chloride solution with sodium perchlorate as the supporting electrolyte. This is in close agreement with literature values. The onset is constant with varying pH values (data not shown). Importantly, chloride oxidation occurs at a lower potential than water oxidation in acidic and neutral conditions. At pH 1, the onset of water oxidation is 170 mV more positive than the onset of chloride oxidation. This offset remains constant until pH 9 where the solvent window begins to narrow due to the oxidation of OH⁻. The solvent window continues to decrease to 1.45 V at pH 12 (data not shown). Our findings indicate that the selective generation of chlorine radicals takes place most readily under acidic conditions.

After finding suitable conditions for selective chlorine radical generation, we turned our attention to the chlorination of ethanol. At ambient temperature, we electrolyzed an aqueous chloride solution containing 100 mM ethanol at a potential of +2.05 V vs Ag/AgCl. The production of 2-chloroethanol was confirmed using solvent suppression NMR against a reference sample (data not shown). As expected, acetic acid, the product of the radical attack at the α-carbon, was also present in the product mixture. At 25° C. the selectivity toward 2-chloroethanol was 3%.

To gain insight into the parameters steering reactivity, we investigated the temperature dependence of the production rate and selectivity for 2-chloroethanol. The impact of temperature was measured at a constant potential of 2.05 V. As shown in FIG. 9A, the ratio of 2-chloroethanol to acetic acid increases with increasing temperature. By conducting the reaction at 80° C. the ratio of 2-chloroethanol to acetic acid more than doubles. This increase in selectivity is driven by both an increase in the partial current density toward 2-chloroethanol as well as a decrease in the partial current density toward acetic acid (FIG. 9B). The sum of the partial current density toward 2-chloroethanol and acetic acid remains comparably constant, suggesting a similar total frequency of radical attacks on ethanol. These trends suggest that at higher temperatures production of the kinetically less favorable product increases. This behavior can be explained on kinetic grounds. The activation energy for hydrogen abstraction at the β-carbon is higher than the activation energy for hydrogen abstraction at the α-carbon. Thus, at increased temperatures, more molecules can take the higher energy pathway to 2-chloroethanol production. This is exemplified by the ratio of the Arrhenius equations of two processes with different activation energies:

$$\frac{k_1}{k_2} = \frac{A_1}{A_2} \exp\left(\frac{1}{RT}(E_{A,2} - E_{A,1})\right)$$

Through these effects, temperature serves as a handle to tune the selectivity of the electrochemical chlorination of ethanol.

Increasing the temperature also changes the mechanism of chlorine radical formation. At room temperature, the formation of 2-chloroethanol takes place through an electrochemical route, with halogen radicals formed by the oxidation of chloride anions at the anode. This reaction also produces chlorine gas through the recombination of chlorine radicals. However, light-driven radical formation plays no role in this system as control experiments in the dark showed no decrease in 2-chloroethanol production (data not shown). At higher temperatures, thermal chlorine radical generation becomes possible. At 80° C. 2-chloroethanol production took place when chlorine gas was introduced into the reaction mixture.

The selectivity of electrochemical ethanol chlorination is also governed by the applied potential. To characterize this behavior, we conducted ambient temperature potentiostatic experiments between 1.95 and 2.3 V. The ratio of 2-chloroethanol to acetic acid was highest at lower driving forces (FIG. 9C). This is explained by a steep increase in acetic acid production at more oxidative potentials, which is accompanied by only a minor increase in 2-chloroethanol production (FIG. 9D). We attribute the increase in acetic acid to two competing reactions. First, direct electrochemical oxidation of ethanol can take place on the anode surface, as was observed by potentiostatic experiments in the absence of NaCl (data not shown). This reaction has an onset potential positive of chloride oxidation, but negative of water oxidation (data not shown) and produces acetic acid at moderate rates. The second is the generation of hydroxyl radicals from water oxidation. This radical has been reported to favor hydrogen atom transfer at the α-carbon of ethanol and thus acetic acid generation. (Oliver and Carey (1977) *Environ. Sci. Technol.* 11:893-895.) Thus, the oxidation of either water or ethanol at the electrode increases acetic acid production without changing 2-chloroethanol production. This is particularly pronounced in the presence of impure BDD electrodes, as we expect that chlorine and acetic acid production are promoted by impurities that are not removed in the conditioning procedure. Indeed, sp² carbon impurities on BDD are known to facilitate inner-sphere reactions and narrow the solvent window. See Watanabe, Akai, and Einaga (2016) *Electrochem. Commun.* 70:18-22.

We found that the kinetics of 2-chloroethanol formation are controlled by the first hydrogen atom abstraction from ethanol. To understand the electro-chlorination pathway, we measured the production rate of 2-chloroethanol under varying concentrations of ethanol and Cl. In all cases, the ionic strength was kept constant. At room temperature, as we increased the concentration of Cl⁻ from 0.0 to 1.0 M, the production rate of 2-chloroethanol increased before reaching a plateau. Similarly, the production rate of 2-chloroethanol increased with increasing ethanol concentration (data not shown). On the other hand, changes to the ethanol concentration left the ratio of 2-chloroethanol to acetic acid unchanged, while increasing Cl⁻ led to a slightly larger fraction of 2-chloroethanol, which we attribute to increased CF generation. This leads us to conclude that the kinetics of the reaction are dominated by the thermodynamic cost of hydrogen abstraction from ethanol.

Epoxidation of 2-Chloroethanol:

The reaction of 2-chloroethanol with hydroxide anions to produce ethylene oxide and regenerate the chloride anion has been investigated previously. McCabe and Warner (1948) *J. Am. Chem Soc.* 70:4031-4034. This reaction occurs in aqueous solutions with pH above 8[8] and reaches up to 96% conversion. In our case, direct conversion of electro-generated 2-chloroethanol to ethylene oxide in the anolyte is not desirable because of further oxidation of the product. Fortunately, this reaction is inhibited by the acidification of the anolyte during electrolysis. Acidification results from three concurrent phenomena: (1) the production of acetic acid resulting from the radical attack on the α-carbon, (2) the increase in proton concentration arising from oxygen evolution, and (3) the disproportionation of $Cl_2$ to form HOCl and HCl. As a result, the pH of the anolyte dropped from 7 to 0.9 over a 4-hour experiment. When mixing the resulting solution with NaOH to increase the pH to 10.5, 2-chloroethanol was converted to ethylene oxide with more than 90% yield.

Figure 10:
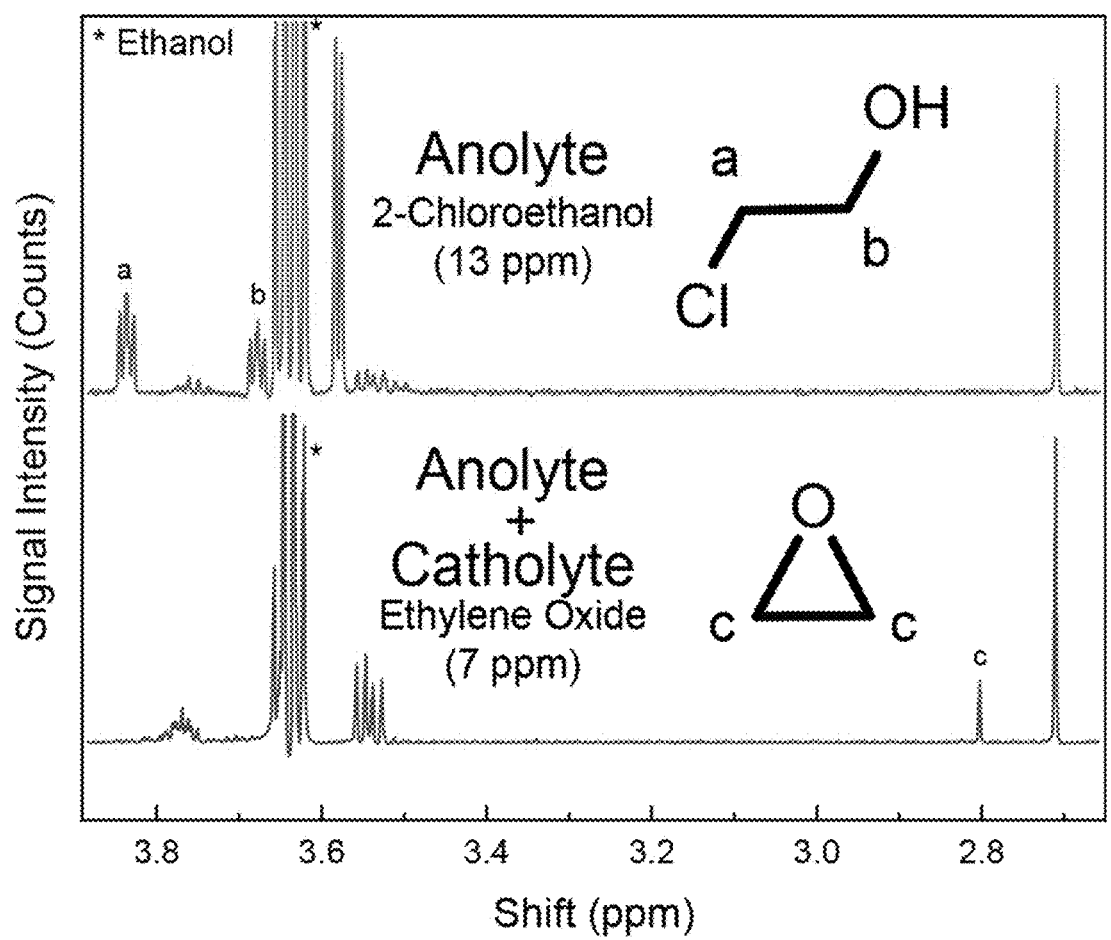
FIG. 10 depicts proton NMR spectra of 2-chloroethanol in the anolyte (top panel) being converted to ethylene oxide upon mixing with the catholyte (bottom panel). Spectra are referenced to DMSO at 2.71 ppm. Ethanol peaks are clipped to show intermediate and product peaks.

The stoichiometry of the overall process allows the transformation of 2-chloroethanol to ethylene oxide be driven by the counter electrode reaction. At the cathode, one molecule of NaOH is formed for every molecule of 2-chloroethanol produced. This is the result of water reduction which leaves behind OH⁻ ions while generating hydrogen. Consequently, while the pH on the anode side of the cell strongly decreases, the pH on the cathode side increases to 12.4 during the 4 h experiment. Mixing the anolyte and catholyte results in a solution with a basic bulk pH (11.5) that is sufficiently alkaline for 2-chloroethanol epoxidation to occur (FIG. 10). The alkaline pH develops because the oxidation of chloride at the anode does not consume the hydroxide ions generated at the cathode. We found that ethylene oxide synthesis was agnostic to the initial electrolyte pH. Whether the pH was 7, 8, or 9, 2-chloroethanol was present in the anolyte. Upon subsequent mixing of the anolyte and catholyte the chlorohydrin was converted to ethylene oxide, independent of electrolyte pH (data not shown). While the selectivity to 2-chloroethanol and ethylene oxide remained similar across the starting pH values, the production rate and Faradaic efficiency for ethylene oxide were highest for the neutral electrolyte.

Integrated Flow Cell for Ethanol Epoxidation:

Having demonstrated the conversion in a batch reaction, an integrated flow cell was constructed to demonstrate continuous production of ethylene oxide from ethanol. To do this, we designed a flow cell, employing BDD both as anode and cathode, with an anion exchange membrane separating the two compartments. Each electrode had a geometric area of 0.25 cm² and the electrode compartments had a volume of 2 mL. The reactor is shown schematically in FIG. 11, An aqueous solution of 0.5 M NaCl and 0 where "AEM" designates the anion exchange membrane. 0.6 M $NaClO_4$ in 0.5 M NaCl was used as both the anolyte and catholyte at a flow rate of 3 mL min⁻¹. The anolyte contained 100 mM of ethanol and the membrane prevented mixing between compartments. Upon applying a potential of 2.05 V vs Ag/AgCl to the anode, a steady-state pH difference of approximately 10 units was established across the membrane. This provided acidic conditions at the anode to favor chloride oxidation over oxygen evolution, while maintaining 2-chloroethanol in its stable form. Simultaneously, the alkaline environment at the cathode produced sufficient OH⁻ to facilitate complete 2-chloroethanol epoxidation upon mixing (data not shown). When operating the flow cell at 80° C. for 2 hours, we observed a steady-state Faradaic efficiency of 1% toward ethylene oxide and 31% when adding acetate production (data not shown). The production rate remains constant upon reaching steady-state conditions (FIG. 12), despite an initial decrease in the current. Hence, the Faradaic efficiency increases over the course of the experiment (data not shown). We expect that the Faradaic efficiency can be further optimized by tuning the relative flux of chloride to ethanol. These results demonstrate the stability of the reaction over extended amounts of time.

Due to the nearly quantitative conversion of 2-chloroethanol to ethylene oxide, the product distribution is defined by the radical chlorination selectivity. Temperature is just one strategy to gain control of chlorination selectivity.

CONCLUSION

Ethylene oxide is one of the most important precursors for the synthesis of chemicals and plastics. Its production is carbon intensive, however, releasing 1.9 tons of $CO_2$ per ton of product. The sustainable production of ethylene oxide requires both the use of a renewable substrate and renewable energy as driving force. To achieve this goal, we introduce a novel electrochemical pathway to produce ethylene oxide from ethanol. Our reaction relies on the electrochemical radical production of 2-chloroethanol from ethanol, followed by its alkaline transformation to ethylene oxide.

We found that the production rate of 2-chloroethanol is impacted by temperature, potential and electrolyte properties. These observations are explained by a mechanism governed by an initial hydrogen atom transfer from ethanol. Based on these findings, we designed an integrated flow cell, capable of continuously transforming ethanol to ethylene oxide with the best atom economy known to date.

The invention is not limited to the embodiments set forth in this disclosure for illustration but includes everything that is within the scope of the claims.

What is claimed is:

1. A method of making hydroxy-alkanes and alkenes, the method comprising:
   in a reactor comprising an anode and a cathode separated by an ion exchange membrane, and containing a reactant comprising an alkane; and a solution comprising water and halogen ions, and
   (a) applying a potential across the anode and the cathode such that halogen radicals are generated from the halogen ions at the anode, the halogen radicals reacting with the alkane to produce a halogenated intermediate as an anolyte, and hydroxyl ions are produced at the cathode as a catholyte; and
   (b) combining the anolyte and the catholyte to yield a hydroxy-alkane and/or an alkene;
   wherein the solution is substantially free of metal ions that undergo oxidation at the anode under the applied potential.

2. The method of claim 1, wherein the anode, or the cathode, or both the anode and the cathode are polarizable electrodes.

3. The method of claim 1, wherein the anode and the cathode comprise a material selected from the group consisting of boron-doped diamond (BDD), tetrahedral amorphous carbon, tetrahedral amorphous carbon nitride, and platinum.

4. The method of claim 1, wherein the ion exchange membrane is an anion exchange membrane.

5. The method of claim 1, wherein the alkane comprises a C1-C12-alkane.

6. The method of claim 1, wherein the alkane comprises a C1-C6-alkane.

7. The method of claim 1, wherein the halogen ions are selected from the group consisting of chloride ions and bromide ions.

8. The method of claim 7, wherein the halogen ions are chloride ions.

9. The method of claim 7, wherein the halogen ions are bromide ions.

10. The method of claim 7, wherein the method occurs within a temperature range of about 20 to about 100° C.

11. The method of claim 7, wherein the method occurs within a temperature range of about 20 to about 80° C.

12. The method of claim 1, wherein the potential applied in step (a) is from about 0.8 V to about 4.0 V vs Ag/AgCl.

13. The method of claim 12, wherein the potential applied in step (a) is from about 1.8 V to about 2.3 V.

14. The method of claim 1, wherein the reactant comprises from about 0.001 M alkane to about 5.0 M alkane.

15. The method of claim 1, wherein the solution comprises from about 0.1 M to about 2.0 M halogen ions.

16. A method of making methanol, the method comprising:
   in a reactor comprising an anode and a cathode separated by an ion exchange membrane, and containing a reactant comprising methane, and a solution comprising water and halogen ions;
   (a) applying a potential across the anode and the cathode such that halogen radicals are generated from the halogen ions at the anode, the halogen radicals reacting with the methane to produce a halogenated intermediate as an anolyte, and hydroxyl ions are produced at the cathode as a catholyte; and
   (b) combining the anolyte and the catholyte to yield methanol;
   wherein the solution is substantially free of metal ions that undergo oxidation at the anode under the applied potential.

17. The method of claim 16, wherein the anode, or the cathode, or both the anode and the cathode are polarizable electrodes.

18. The method of claim 16, wherein the anode and the cathode comprise a material selected from the group consisting of boron-doped diamond (BDD), tetrahedral amorphous carbon, tetrahedral amorphous carbon nitride, and platinum.

19. The method of claim 16, wherein the ion exchange membrane is an anion exchange membrane.

* * * * *